(12) United States Patent
Rosen et al.

(10) Patent No.: US 9,330,203 B2
(45) Date of Patent: May 3, 2016

(54) REAL-TIME EVENT FEEDBACK

(71) Applicant: QUALCOMM Incorporated, San Diego, CA (US)

(72) Inventors: Eric C. Rosen, Solana Beach, CA (US); Susan M. Hennenfent, San Diego, CA (US); Harleen K. Gill, Del Mar, CA (US); Beth A. Brewer, New Braunfels, TX (US); Matthew K. Anderson, San Diego, CA (US); Vincent M. Kemler, San Diego, CA (US); Natalie A. DePratt, San Diego, CA (US); Lauren K. Leung, San Diego, CA (US); Hemish Parikh, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 486 days.

(21) Appl. No.: 13/781,741

(22) Filed: Feb. 28, 2013

(65) Prior Publication Data

US 2013/0231760 A1 Sep. 5, 2013

Related U.S. Application Data

(60) Provisional application No. 61/606,366, filed on Mar. 2, 2012.

(51) Int. Cl.
*G06F 19/00* (2011.01)
*G06F 17/40* (2006.01)
(Continued)

(52) U.S. Cl.
CPC ............. *G06F 17/40* (2013.01); *A63B 71/06* (2013.01); *A63B 71/0686* (2013.01); *A63F 13/816* (2014.09); *G07C 1/22* (2013.01)

(58) Field of Classification Search
CPC ......... G06F 17/40; G07C 1/22; A63B 71/0686; A63B 71/06; A63F 13/816
See application file for complete search history.

(56) References Cited

U.S. PATENT DOCUMENTS 5,511,045 A   4/1996   Sasaki et al.
5,737,280 A * 4/1998   Kokubo ............... G07C 1/24
                                              235/377

(Continued)

FOREIGN PATENT DOCUMENTS

FR      2896325 A1   7/2007
JP   2002282408 A   10/2002

(Continued)

OTHER PUBLICATIONS

International Search Report and Written Opinion—PCT/US2013/028700—ISA/EPO—Jun. 12, 2013.

*Primary Examiner* — Milap Shah
(74) *Attorney, Agent, or Firm* — Brian Momeyer

(57) ABSTRACT

Methods, systems and devices are provided for presenting event feedback information regarding participants to an event. A first radio of a first participant device carried by a first participant receives a first checkpoint communication from a checkpoint device at a first checkpoint located along a first course of the event. The first checkpoint communication includes a first checkpoint identifier and a first event time reflecting when the first participant crossed the first checkpoint. A first checkpoint event time is determined based upon the first checkpoint identifier and the first event time. Also, the first checkpoint event time is displayed on the first participant device. Further, a checkpoint device and an event server may be used to in presenting the event feedback information.

44 Claims, 15 Drawing Sheets

(51) Int. Cl.
*A63B 71/06* (2006.01)
*A63F 13/816* (2014.01)
*G07C 1/22* (2006.01)

(56) References Cited

U.S. PATENT DOCUMENTS

| | | | |
|---|---|---|---|
| 8,649,890 B2 * | 2/2014 | Martin | A63B 71/06 700/91 |
| 2003/0235116 A1 * | 12/2003 | Stobbe | A63B 9/0028 368/3 |
| 2004/0006445 A1 * | 1/2004 | Paek | G04F 10/00 702/178 |
| 2004/0100566 A1 * | 5/2004 | Valleriano | G07C 1/22 348/231.99 |
| 2006/0176216 A1 | 8/2006 | Hipskind | |
| 2006/0217232 A1 * | 9/2006 | Kondrat | A63B 24/0021 482/3 |
| 2007/0182567 A1 * | 8/2007 | Stewart | A63B 71/0605 340/572.8 |
| 2008/0258917 A1 * | 10/2008 | Boyd | A63B 24/0062 340/572.1 |
| 2008/0278314 A1 | 11/2008 | Miller et al. | |
| 2009/0213700 A1 * | 8/2009 | Conant | G04F 8/08 368/113 |
| 2010/0088023 A1 * | 4/2010 | Werner | A63B 24/0021 701/467 |
| 2010/0160014 A1 | 6/2010 | Galasso et al. | |
| 2011/0233282 A1 | 9/2011 | Howell | |
| 2011/0250937 A1 | 10/2011 | Hubbard et al. | |
| 2012/0025944 A1 * | 2/2012 | Hansen | G07C 1/24 340/3.21 |
| 2012/0072172 A1 * | 3/2012 | Howell | G07C 1/24 702/178 |
| 2012/0120771 A1 * | 5/2012 | Lapides | G07C 1/24 368/10 |
| 2012/0223817 A1 * | 9/2012 | Hansen | G07C 1/24 340/10.33 |
| 2012/0274508 A1 * | 11/2012 | Brown | G04F 10/00 342/357.25 |
| 2012/0303753 A1 * | 11/2012 | Hansen | A63B 24/0021 709/217 |
| 2012/0319822 A1 * | 12/2012 | Hansen | A63B 71/0616 340/10.1 |
| 2013/0143631 A1 * | 6/2013 | Platzer | A63H 18/005 463/6 |
| 2013/0166049 A1 * | 6/2013 | Werner | G06F 19/3481 700/91 |
| 2013/0285794 A1 * | 10/2013 | Hansen | G01S 5/0294 340/8.1 |
| 2013/0300542 A1 * | 11/2013 | Hansen | G07C 1/24 340/10.1 |

FOREIGN PATENT DOCUMENTS

| | | |
|---|---|---|
| JP | 2006235864 A | 9/2006 |
| WO | 0100281 A2 | 1/2001 |
| WO | 2008121856 A1 | 10/2008 |

* cited by examiner

REAL-TIME EVENT FEEDBACK

RELATED APPLICATIONS

This application claims the benefit of priority of U.S. Provisional Patent Application No. 61/606,366 entitled "DEVICE AND METHOD FOR REAL-TIME RACE FEEDBACK TO PARTICIPANT" filed Mar. 2, 2012, the entire contents of which are hereby incorporated by reference for all purposes.

BACKGROUND

Events with a large number of participants, such as a race, create a challenge for tracking official start times. For example, a marathon race with hundreds or thousands of runners necessarily creates a crowd that may not be feasibly observed on an individual basis. Conventionally, each runner wears a bib containing a radio frequency identification (RFID) tag that responds to an interrogation signal by transmitting a unique RFID code. One or more checkpoints along the route may use an RFID reader to identify each runner passing the checkpoint and to record a corresponding time value. Event information such as elapsed time, lap time, speed, etc., may be calculated and maintained for each runner. The runners turn in their bib at the end of the event to validate their having run the race.

Typically, the runners receive feedback visually as to their race time during the race because all of the runners are at the same venue. For example, a local race time is made visible to runners at the checkpoints. However, that local race time displayed in this way is a generic elapsed time for the entire race, which may not be in perfect synch with an official race time kept remotely and is not specific to any particular runner. Individual runners cross the starting line at different times, meaning each participant's elapsed time is different from that local race time being displayed. While individual runners may wear a sports or fitness watch to monitor an unofficial race or lap time it is often inaccurate or unreliable. Also, spectators are often further limited in the type and accuracy of information they can obtain regarding participants.

SUMMARY

The various embodiments provide methods, systems and devices for tracking and presenting event feedback regarding participants to an event, such as a race. A portable identifying device worn or carried by a participant, referred to as a "participant device" may transmit a participant identifier from the participant device to a checkpoint device at a checkpoint located along the course of the event. The participant device then receives a checkpoint communication from the checkpoint. The checkpoint communication includes a checkpoint identifier and a checkpoint event time reflecting when the participant crossed the checkpoint. A determination may be made of an elapsed time specific to the participant based upon the checkpoint identifier and the checkpoint event time. The participant elapsed time may then be displayed on the participant device. Also, the participant device may communicate with an event server by way of a wireless wide area network (WWAN) transceiver included in the participant device or in a secondary participant device also worn or carried by the participant. The communications via WWAN with the race server may exchange information about the participant, such as global positioning system (GPS) location information or physiological information, and/or serve as a mechanism for verifying or ensuring the participant receives checkpoint race times, which may be translated into participant elapsed times.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
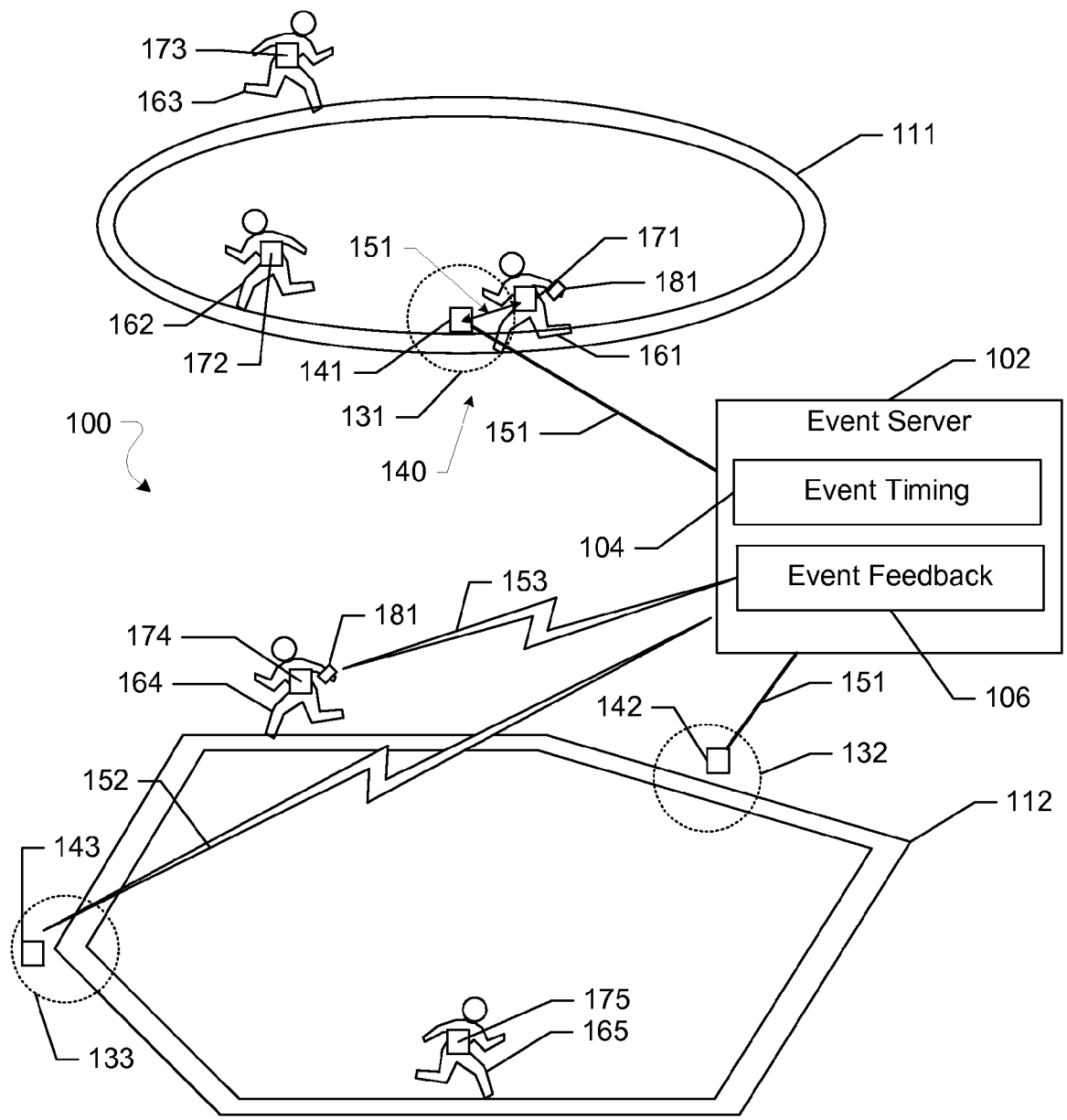
FIG. 1 is a component block diagram of a multiple-venue event feedback system interacting with a participant device in accordance with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations. Additionally, use of the words, "first," "second," "third," "primary," "secondary" or similar verbiage is intended herein for clarity purposes to distinguish various described elements and is not intended to limit the invention to a particular order or hierarchy of elements.

The various embodiments include methods and systems for presenting feedback information regarding participants of an event using one or more small electronic device(s) (referred to individually as a "participant device"). The term "feedback" as used herein refers to the transmission of evaluative or corrective information about an action, event, or process to the original or controlling source or more generally to the information so transmitted. The term "event" as used herein refers to organized happenings, occurring in one or more certain places during a particular interval of time. For example, one or more contests, in a program made up of one or more sports, hobbies or pastimes, is considered an event. An event includes one or more races, competitions, activities and trials. Also, an event may be an interval of time during which exercising, training or practicing occurs. An event may include any number of participants, including just a single participant. The term "participant" refers to an individual taking part in the event to which reference is made. In contrast, a "non-participant" includes other individuals not actively participating in the event, such as spectators, organizers, staff or other individuals associated with a participant but not actively participating in the event.

The methods and systems include transmitting a participant identifier from a participant device (which identifies the device) worn or carried by a participant during the event to a wireless checkpoint device at a checkpoint located along a course of the event. The expression "carried by" a participant herein should be understood to mean worn, carried and/or otherwise held in close proximity to a participant during the event. The methods and systems also receive a checkpoint communication from the checkpoint that includes the checkpoint's identifier and a checkpoint event time reflecting when the participant crossed the checkpoint. As used herein, a "checkpoint event time" or just "event time" is an elapsed time relative to the start of the event. One or more event servers maintaining an official event time, which runs relative to the start of the event. That official event time may be sent periodically in the form of time update values to the checkpoints to maintain the checkpoint event times in synch with the official event time. Once a participant device crosses a checkpoint, a determination may be made as to an individual participant's elapsed time based on when the participant crossed the checkpoint. A first checkpoint may be a checkpoint or starting line, which may be used to determine an individual participant's event start time and reflects when they individually started the event if it is different from the official event time. Using the first checkpoint identifier and the checkpoint event time, a distance from the start of the event may be determined. Also, knowing a participant identifier, this information may be correlated to determine a participant elapsed time, which may be displayed on the participant device.

Transmissions from and to participant devices may be accomplished using one or more of various technologies including, RFID, Wireless Wide Area Network (WWAN), Bluetooth® and/or ANT® technologies, which may be networked to an event server. The participant device may thus receive event feedback, such as a ranking or the performance of other participants of the event, which may be displayed on the participant device. The participant device may include a GPS receiver and physiological sensors. Also, the participant device may include one or more long or short range radios (e.g., WWAN, RFID, Bluetooth® or ANT® radio) configured to receive data from other wireless devices, such as event system monitors and physiological sensors (e.g., pulse sensor, thermometer, perspiration sensor, etc.) that may be also carried by the participant. As used herein the term "radio" refers to a device used to wirelessly transmit and receive impulses or signals representing data, information and/or a message. A radio can include a receiver and a transmitter, which can collectively be referred to as a transceiver. The participant device may also display an indication of the geographic location of the participant as well as physiological data that might be measured by physiological sensors.

The participant device may communicate with an official event centralized computer database, referred to as an "event server." The event server may coordinate event tracking and timing activities and may communicate with the various checkpoints over a primary communication network, while communicating separately with the participant device over a secondary communication network. In this way, the participant device may receive an official participant elapsed time, ranking and other information from the event server, which may be updated on the display for the participant.

The participant device may include both short range (e.g., Bluetooth® or ANT® radios) and long range (WWAN) transceivers enabling it to communicate with wireless devices and networks associated with the event, such as event checkpoints along a course or the event server. For example, when approaching a check point, the participant device may switch to using a short range transceiver to establish a wireless data link with a checkpoint wireless device for communicating time and participant status, and then switch back to using a WWAN transceiver when out of range of a checkpoint device. The decision to switch to the short range transceiver may be made automatically by the participant device based on proximity detection to a checkpoint, such as when it is within a predetermined distance of a checkpoint wireless device based on its own GPS location information, signals received from an event server via the WWAN transceiver or other indicators. Alternatively, predictive switch timing can be based on the participant's current, recent or average pace. Also, as yet a further alternative, the participant may manually perform the switch with a user interface on the participant device.

The participant device may include a processor configured with software and event parameters to enable it to manage communications with the event devices, such as checkpoint devices or the event server.

The participant may carry more than one participant device each including a short range wireless radio (e.g., a Bluetooth® or ANT® radio). In this way the participant devices may establish a personal area network between themselves, such as a wireless interface configured to exchange data. Additionally, at least one of those participant devices may also communicate wirelessly with checkpoint devices. In such an embodiment, the participant's identifier may be transmitted to the wireless check point device by a first participant device, and information may be received from the wireless check point by way of a second participant device.

The embodiment devices and systems enable an event server to provide feedback to participants in an event, as well as spectators or other interested individuals, by maintaining an official event time during the event, transmitting time updates based on the official event time to checkpoints located along an event course, receiving participant elapsed time reports for participants transmitted from the checkpoint devices, and receiving participant status transmitted from participant devices carried by the event participants. Status information from event participants may include participant elapsed times, GPS location and physiological data. The event server may also transmit event feedback to the event participant directly, thus bypassing communication through one or more checkpoints.

FIG. 1 illustrates an example of an event feedback system 100 which includes an event server 102 that has an event timing component 104 and an event feedback component 106. The event feedback component 106 may enable participants 161-165 to simultaneously race in the same event, but at multiple race venues, which for exemplary purposes are depicted as a first course 111 (illustrated as an oval track) and a second course 112 (illustrated as a hexagonal route). In this example, the oval track is one course of the event in one venue and the street route is another course of the event in a second venue, which is a different venue from the first venue even though the participants are in the same race. Thus, participants in many different locations may simultaneously compete in a single race event. Each participant 161-165 may wear or carry a participant device 171-175, respectively, that identifies them and responds to wireless connection 151 by one or more checkpoint devices 141-143 at respective checkpoints 131-133, such as a first checkpoint 131, a second checkpoint 132 or a third checkpoint 133, by responding with a participant identifier. Each checkpoint device 141-143 may function as, or be part of, a local timing system 140 that may communicate a time value corresponding to an event time to the participant device, which then displays the event time to the participant. That time value reflects when the participant identifier was received by the respective checkpoint device 141-143 and which time value is synchronized with the event server that maintains an official event time. That time value, as well as a checkpoint identifier communicated from the checkpoint device 141-143 to the participant may be directly translated into an official participant elapsed time. Alternatively, the checkpoint devices 141-143, or an associated device at the checkpoints 131-133, may perform the translation and communicate the participant elapsed times to individual participant devices 181 for display to the respective participants 161, 164. Each checkpoint device 141-143, or an associated device at the checkpoint 131-133, may further communicate the checkpoint identifier, the participant identifier and either the associated time value or the translated participant elapsed time to the event server 102 via a backhaul network 152, which may be wired or wireless.

At least one of the participants 161-165 may carry a second participant device 181. The second participant device 181 may communicate with the participant device 171 for communicating event times, checkpoint identifiers and/or checkpoint event times. Also, the second participant device 181 may provide event feedback received from the event timing component 104 of the event feedback system 100. For example, consider a first participant 161 wearing the second participant device 181. The second participant device 181 may be configured to present event information to the participant 161, such as the first checkpoint event time. The first participant device 171 worn by the participant 161 may transmit a participant identifier to the checkpoint device 141 at the first checkpoint 131 of the first event venue corresponding to the first course 111. In some embodiments, the first participant device 171 may be physically attached to the second participant device 181. Alternatively or in addition, the first participant device 171 may communicate with the second participant device 181. Alternatively or in addition, the second participant device 181 may function as the first participant device 171 for the participant.

The second participant device 181 may be configured to determine a checkpoint event time based upon the event time received from the checkpoint, to calculate event information associated with the participant 161 based upon the time value, and to present such event information on a user interface of the second participant device 181.

In an exemplary embodiment, the second participant device 181 may communicate via a WWAN 153 with the event server 102. Alternatively or in addition, the second participant device 181 may communicate via a low power radio protocol via a base station at the respective event venue, which for clarity is depicted as being a connection 151 with the checkpoint device 141 in FIG. 1.

For exemplary purposes, the participants 161-165 are depicted as runners at each venue. However, the event feedback system 100 may be implemented at a single venue. In addition, participants 161-165 may be walking, running, biking, swimming, skiing, operating a vehicle or other forms of racing. Also, at least some of the participants 161-165 may by supported by a human-powered apparatus, such as a wheel chair, bicycle, etc., a powered vehicle, such as a race car, motorcycle, motor boat, sailboat, aircraft, etc. Additionally, the embodiments may be used in multi-mode racing, such as triathlons, biathlons, pentathlons, decathlons, etc.

Figure 2:
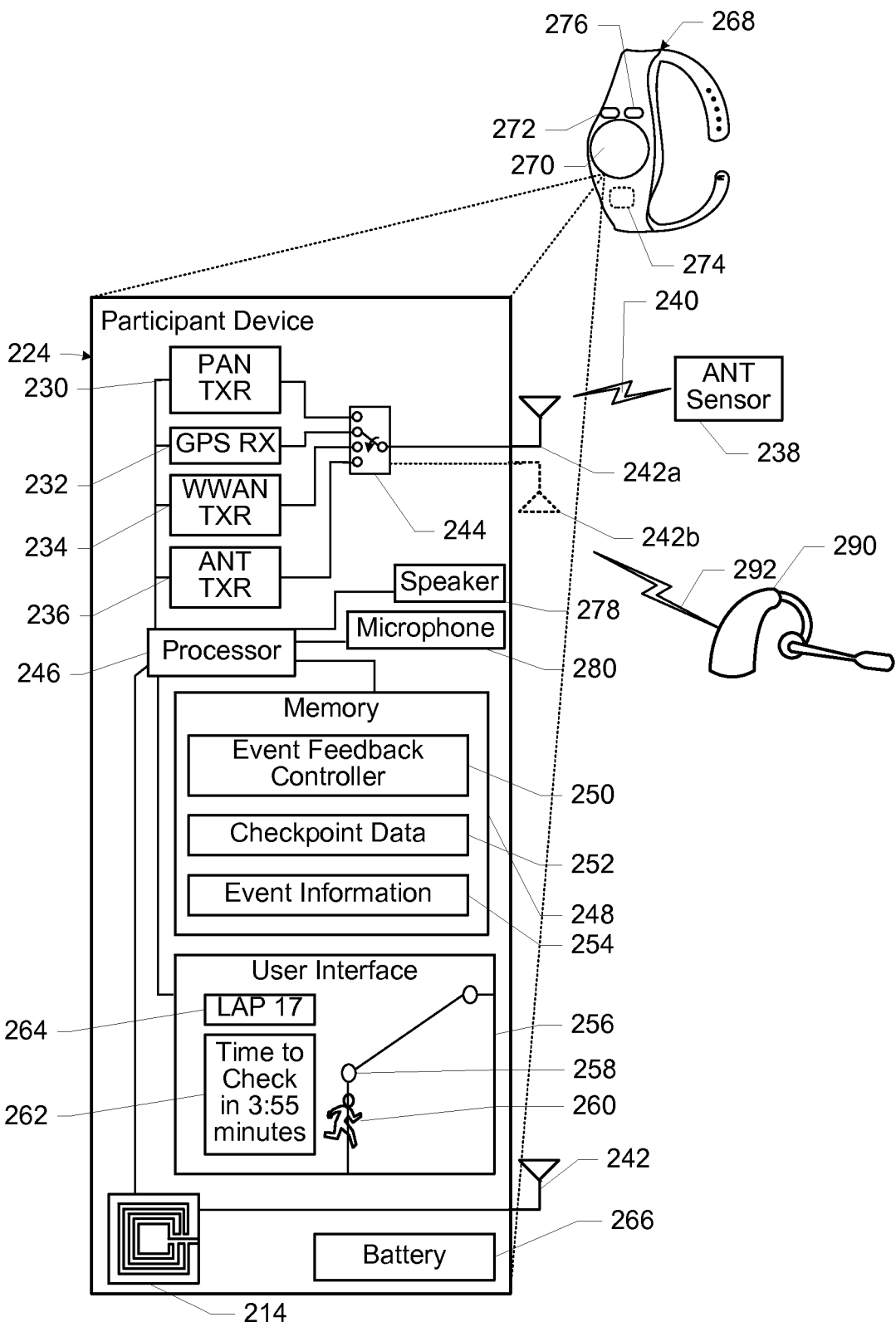
FIG. 2 is an illustration of a participant device suitable for use with the various embodiments.

In FIG. 2, a participant device 224 according to an embodiment incorporates four radios and a physically and functionally integrated participant identifier, depicted as an RFID device 214. One radio is depicted as a Personal Access Network (PAN) transceiver (TXR) 230 (for example Bluetooth®, Zigbee, etc). A second radio is depicted as a WWAN transceiver 234, for example a cellular transceiver. A third radio is depicted as a GPS receiver (RX) 232. A fourth radio is depicted as an ANT® (Dynastream Innovations Inc., Cochrane, Alberta Mayada) transceiver 236, which may be used for instance to receive physiological data, such as a fitness parameter, of the participant detected by an ANT® sensor 238, which may be incorporated into the participant device 224 or wirelessly communicating with the participant device 224 as depicted at 240. Embodiments may include a different number or different types of radios.

As used herein, the ANT® transceiver 236 is an exemplary low power radio technology protocol which may encompass the ANT® protocol, ANT+ (or ANT® Plus) protocol, etc. ANT+ protocol is an interoperability function that may be added to the base ANT® protocol, which is a proprietary wireless sensor network technology. ANT+ is primarily designed for collection and transfer of sensor data, to manageable units of various types. The ANT+ protocol radio may be used for data-transfer for a number of devices such as heart rate monitors, speed sensors, cadence sensors, foot pods, power meters, activity monitors, calorimeters, body mass index measuring devices, blood pressure monitors, blood glucose meters, pulse oximeters, positions tracking, short range homing beacons (e.g., disc golf, geo-caching), weight measuring devices, control of music players, temperature sensors, etc.

To provide certain economies of cost and size, the participant device 224 may include one antenna 242 with a multiplexing or switching component 244 coupling the various transceivers, transmitters or receivers in a way to avoid mutual interference, such as frequency duplexing or time duplexing. Alternatively, the participant device 224 may utilize multiple antennas 242, 242a, 242b for simultaneous communications, spatial diversity, or for optimizing for different frequency bands. As shown in FIG. 2, the RFID device 214 may have a dedicated antenna 242. As another example, the switching component 244 may switch between or simultaneously use multiple antennas 242a, 242b. In general, any number of antennas may be used in various embodiments.

At least one processor 246 may control the communications by utilizing data and applications stored in a computer-readable memory (local memory) 248, at a portion of which provides non-transitory storage. For instance, event feedback controller 250 implemented in software may access checkpoint data 252, which may be provisioned in advance of an event or detected or received during the event. Event information 254 may include locally calculated data based at least in part from the checkpoint data 252. For example, a user interface 256 may display a route 258, a location 260 of the participant relative to the route 258, a time requirement 262 for the participant to meet to remain in the event, and checkpoint identifier 264.

The participant device 224 may be powered by an autonomous power supply, depicted as a battery 266. Other examples include a fuel cell, super capacitor, a movement-actuated generator, etc.

In an exemplary embodiment, the participant device 224 fills a gap in the fitness market by combining wireless network access, GPS, and fitness accessories to create a fitness and safety product. In one aspect, music and data as well as voice communication features eliminate the need for the participant or user to carry multiple devices in order to accommodate the user's desire to play music, track fitness activities and routes, and stay in touch with family and friends during workout activities.

In particular, the participant device 224 meets the needs of both professional athletes and amateurs by offering a wide variety of features and hardware capabilities such that the participant device 224 may be used to enhance user's fitness activities. The participant device 224 may include a wrist-worn device 268 that provides fitness coaching and logging; a music player; voice and data communications; and location tracking and route guidance and a web application that allows the user to track, manage and share workout routines, fitness goals, nutrition logs, and routes.

Embodiments of the participant device 224 may be contained within a single enclosure or distributed in multiple components that are interfaced by wires or by wireless data links. Some embodiments described below include more than one participant device, with one operating independently from another that includes a participant identifier. Portions or the entirety of the participant device 224 may be worn on any portion of the body, hand carried, carried by stowing in a harness or other carried or worn item (e.g., backpack, hip pack, etc.), or carried by being attached to conveyance that bears the participant (e.g., wheel chair, bicycle, etc.). Also, participant devices may be built into racing equipment and vehicles, such as within skies, ski boots, bicycle frames, boat hulls, vehicle chasses, etc.

Additional features may be included in the participant device 224, such as a fitness coaching and logging functions that enable the user to establish and maintain a workout routine, set workout goals and receive guidance on how to meet those goals, capture and analyze workout data such as: speed, distance, pace, heart rate, calories, laps, power, and elevation.

A music feature may be included to enable the user to play pre-established playlists from music management applications, streaming music sources, etc. Playlists may be downloaded to the participant device 224 for play during the day or throughout a workout. With local memory 248 for storage of music, the music feature eliminates the need for the user to carry a separate music device during fitness activities.

A location tracking and route guidance features may be included to enable the user to keep track of the route that the user will traverse or has traversed during the workout or event. This feature may assist navigating to and from the route from a starting point as well as being able to report GPS location in case of an emergency.

Communication features of the participant device 224 may be included to enable the user to stay in touch with family, friends or trainers while the user is working out or racing. The data and voice communication feature may be used to provide the user with the means to make or receive urgent communication while the user is working out or racing. The voice communication also allows the user to place an emergency call to authorities in the event the user is lost, injured or concerned for his safety.

In addition to the features described above, the participant device 224 may incorporate a variety of capabilities that may be used to enhance the user experience and to provide operability in a range of conditions. For instance the wrist-worn device 268 may be a waterproof and sweat proof container provided with a user interface 256 that compensates for ambient temperature and lighting conditions and that operates in a wide range of environmental temperatures.

The participant device 224 may enable user interaction through touch menus on a display 270 of the user interface 256, dedicated buttons 272 independent of the display 270, and a vibration motor 274 which may be used to get the attention of the user. An emergency button 276 may enable instant communication with authorities or In Case of Emergency (ICE) contacts at the touch of a button. The participant device 224 may further include an audio speaker 278 which may be used to provide the event feedback or other prompts and commands (e.g., in the form of tones or synthesized speech), as well as a microphone 280 which may be coupled to a voice recognition module within the processor 246 to enable the processor to receive user inputs via voice commands.

Integrated GPS functionality may refine fitness or event data, such as speed, pace and elevation may provide for accurate tracking and replaying of workout or race routes, may provide dynamic route guidance, and may report the GPS location for emergency personnel or to confirm compliance with a race route. GPS is a navigational system that enables GPS receivers to determine their latitude and longitude on Earth by computing the time difference between signals received from different satellites. GPS location will thus indicate where a participant is geographically located at any given instant.

The participant device 224 may provide connectivity to peripheral devices through the Bluetooth® and/or ANT® technologies. For example, the participant device 224 may use a Bluetooth® wireless data link 292 to play music through a wireless headset 290 or to collect fitness data from a Bluetooth-enabled fitness accessory (not shown in FIG. 2). Alternatively or in addition, the participant device 224 may use the Bluetooth-enabled fitness accessory to provide event feedback, such as an alert that the participant crossed an event checkpoint or an update on the participant's pace. Further, a Bluetooth® wireless headset 290 may be used instead of a speaker 278 and microphone 280 to provide event feedback and/or receive voice commands.

The participant device 224 may connect to multiple ANT® accessories to collect the fitness data provided by the ANT® accessories and ultimately provide the user with a data rich workout or event experience. Similarly, the participant device 224 may use ANT® technologies to alternatively or redundantly perform any of the functions noted above for Bluetooth®. For example, ANT® technologies may be used to provide event feedback, such as a proximity alert when a participant approaches and/or crosses a checkpoint.

The WWAN capability may be used to download comparisons to other participants in the event, ranking or place in the event overall, etc. The ranking or place may reflect a participant's hierarchical listing from best to worst event time. Similarly, geographic location information may be exchanged to identify the relative positions of participants in the event. Additionally, to facilitate receipt of checkpoint event time values and event information, the WWAN capability may be used to upload physiological data and route data captured by the participant device 224 and to download event statistics and participant-to-participant comparisons or rankings, workout configuration, music playlists and user preferences. The participant device 224 may use the WWAN capability for voice and texting activities as well as for other applications executed on the participant device 224.

When docked in a charger, the participant device 224 may connect to the user's laptop or desktop computer via a standard universal serial bus (USB) interface. The USB interface may be used for uploading the workout and route data captured by the participant device 224 to remote servers, downloading workout configuration, music playlists and user preferences from the remote servers, and charging the battery 266.

Thus, the participant device 224 may provide a wrist-worn device 268 with the following hardware capabilities: WWAN, GPS, RFID, PAN (such as Bluetooth®) and ANT®. WWAN access provides voice and data communication, GPS may enable location tracking, ANT® may capture fitness data from wireless ANT® accessories, and RFID may capture track checkpoint event timing. In total, the participant device 224 may create a fitness and racing product that enhances activities performed by the user.

With GPS and ANT®, the device may capture and analyze workout data for runners, cyclists, hikers, etc. For example, physiological data may be sensed such as pace, distance, heart rate, calories, laps, power, revolutions per minute (RPM), speed and elevation. Physiological data includes fitness parameters representing an individual's well being or level of fitness determined from physiological measurements, such as vital signs or other indicators. Using this physiological data, the participant device 224 may be used for racing and training year-round. For example, the participant device 224 may download a track identifier, track physical layout, tack geographic coordinates, track elevation, road grade of portions of the track, distance to the track from current location, dimensions of or distance between points on the track, type of terrain, etc. Such information may be beneficial for training for a particular event.

In a traditional RFID race timing system, an RFID transponder is placed in the bib or other accessory the race participant wears. RFID readers may be placed at checkpoint crossings around the race track. The RFID reader receives a participant's participant identifier which may be transmitted by the RFID transponder in the participant's bib/accessory. The RFID reader may determine the precise time of each checkpoint crossing by observing the time at which the race participant's participant identifier was received by the RFID reader. The RFID reader then may communicate that timing to the official race server. The race participant receives no indication as to their race status or performance within the race.

Integrating the RFID device 214 into the wrist-worn device 268 allows the race organization to replace or augment the current RFID bib for the event participant with the proposed participant device 224. Identical to the RFID in the bib/accessory, the RFID device 214 in the participant device 224 may be capable of sensing checkpoint crossings with competition-precision timing by detecting the RFID reader's broadcast. However, unlike the RFID in the bib/accessory, the RFID device 214 in the device may enable the real-time display of checkpoint event time on the wrist-worn device 268 for the event participant to stay attuned to their progress in the race. Checkpoint event time and checkpoint identifier, such as the checkpoint number, may be communicated to the wrist-worn device 268 in order to calculate and/or display an event time corresponding to checkpoint event time(s). In addition, the wrist-worn device 268 may use the WWAN to communicate a participant status, such as the captured timing data, to the event server and to retrieve the event participant's race ranking and position in the race, in addition to other statistics that may be interesting to the participant. Examples of other event information include position within their age, sex, racial designation or other demographic class overall, how much distance exists between the participant and next competitor, first place runner or a friend, etc.

Since the RFID device 214 in the wrist-worn device 268 operates as a traditional RFID in a participant's bib/accessory, the RFID readers at checkpoint crossing may also capture the participant's timing. By allowing both the wrist-worn device 268 to capture and transmit the checkpoint event time and the official event feedback system to capture the checkpoint event time, the official event feedback system may validate the wrist-worn device is accurately capturing the timing data for the event participant. This may be important in events in which not all participants are wearing the wrist-worn device 268.

Combining the checkpoint event timing with physiological data captured by ANT® and/or other sensors on the participant device 224 and enabling the transmission of that data via WWAN communication provides the ability to share participant status related to a participant. The participant status may be used to generate interesting statistics about participant's pace, heart rate, location, race position, lap timing, etc., with family and friends via an application for spectators. This information may enhance the spectator experience. The collection and communication of such participant status information is not limited to embodiments including RFID, but is applicable to all embodiments.

In an exemplary implementation, an RFID device 214 inside a wrist-worn device 268 may be directly interfaced to a GPS-enabled Mobile Station Modem (MSM). The RFID transponder chip may have an exposed microcontroller unit (MCU) interface. A forward link of the RFID reader at the checkpoint may be used to transmit checkpoint event time and a checkpoint identifier to the RFID transponder inside of the device. The device locally stores checkpoint and calculates/stores the user's lap times. The device may provide immediate feedback to the user when they have crossed the checkpoint. The device may provide a history of checkpoints crossed and lap times, and distance until the next checkpoint.

The device may support GSM/UMTS communication protocols and therefore has a 900 MHz capable antenna. UHF RFID falls within this frequency range of the antenna. Hence, the same antenna may be used for these radios. The device may switch its 900 MHz antenna to RFID port (as opposed to WWAN) as the user approaches the checkpoint. Based on the accuracy of GPS location fix and course geometry/environment, the antenna switch to RFID could happen a predetermined distance, such as 50 feet, prior to checkpoint or much sooner (300 feet), if WWAN is not needed.

As a fallback, if the device detects (based on GPS location or other indication) that the user has crossed a checkpoint, but did not receive an updated checkpoint event time and checkpoint number, the device will ping the database via WWAN to see if the RFID reader received data from the RFID transponder at that checkpoint. For 900 MHz antenna time duplexing, the WWAN communication may for example happen between the locations just after the checkpoint to mid-lap between checkpoints.

Figure 3:
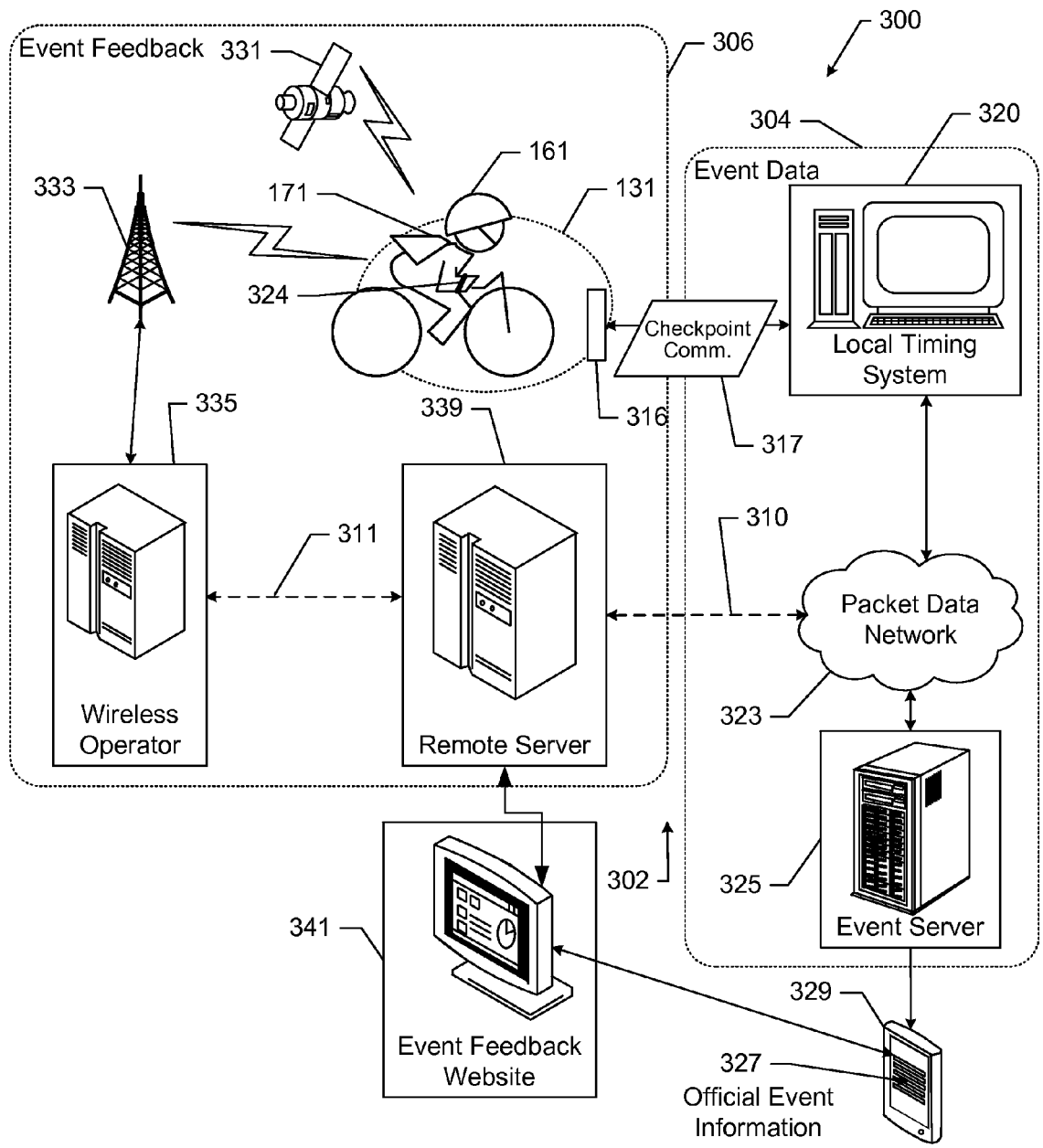
FIG. 3 is a communication system diagram illustrating network components of embodiment architectures suitable for use in various embodiments.

In FIG. 3, an event feedback system 300 may utilize a distributed event system 302 according to an embodiment that separates functions of an event data 304 component from an event feedback 306 component. In a first scenario supported by this configuration, a second participant device 324 may be worn by a participant 161 who is also wearing an event bib as the first participant device 171. With the event data 304 component and event feedback 306 component operating separately but communicating, a first level of functionality may be provided to the participant 161. In a second scenario, the checkpoint communications 317 and/or a first network interface 310 may enable official event data, such as official event times, checkpoint event times, participant elapsed times, participant physiological data, participant location information, participant rankings and other event information related directly to the participant 161 or related to other participants, to migrate from the event data 304 component to the event feedback 306 component. In a third scenario, a second network interface 311 may enable that official event data to migrate back to an individual participant 161. Thus, the participant 161 may receive tightly coupled and accurate information about their overall event status, as well as the event status of other participants. This may include informing the participant 161 about start and lap events as well as providing competition-precision timing and rankings at the second participant devices 324.

The participant 161 enters a checkpoint 131, causing the first participant device 171 to be detected by a checkpoint device 316, which in turn sends checkpoint communication 317 to a local timing system 320 of the event data 304 component. The local timing system 320 sends a publish message via a packet data network 323 (e.g., the Internet) to an event server 325 that may disseminate official event data including live tracking to end user devices 329. Alternatively, the event server 325 may validate information, such as checkpoint event times received from the second participant device 324 bypassing the checkpoint 131 using the WWAN 333 communication network. Also, the event server 325 may correct and/or update checkpoint event times by sending a publish message via the packet data network 323 to the remote server 339, which in turn may include such information as part of participant status that is then transmitted through the wireless operator 335 via the WWAN 333 to the second participant device 324.

With regard to the event feedback 306 component, the second participant device 324 worn by the participant 161 may receive signals from GPS satellite 331 for determining location, referred to as GPS location information. Such GPS location information is considered participant status data collected by the second participant device 324, along with checkpoint event times received from the checkpoint 131 and other information related to the participant 161. The second participant device 324 may transmit such information wirelessly via WWAN 333 to a wireless operator 335, which in turn may forward such participant status data to remote server 339. It should be understood that the participant status data may be communicated by various network connections, wired and/or wireless, beyond the WWAN 333 communication directly from the second participant device 324.

The second participant device 324 may include integrated processor capabilities that may execute an event application that disables certain functions to conserve battery life, avoid distractions to the user that may affect user safety or other as otherwise desired. The second participant device 324 may collect and present physiological data when used with, or incorporating, a heart rate monitor. The event application may provide GPS location information to the participant 161 through a display on the second participant device 324 throughout the event. Also, before, during and after an event, the participant 161 may access other fitness capabilities, music and real time interaction with an event feedback website 341, as well as configuration and reporting applications. Spectators may also utilize end user devices 329 to access the event feedback website 341, in addition to the official event data with live tracking.

The second participant device 324 may be synchronized with official event data received via the remote server 339 from the event server 325 for distribution, in order to capture an official checkpoint event time corresponding to when the participant 161 crossed the first checkpoint 131 that may be different from the first checkpoint event time received by the second participant device 324 through the checkpoint communication 317 received by way of a checkpoint device 316. Alternatively or additionally event parameters, such as distances or allotted time interval for completing one or more laps or route segments, may be preloaded or dynamically loaded on the second participant device 324. In an exemplary embodiment, the second participant device 324 may display one or more of the following:

a participant elapsed time, which represents a total elapsed time from when the participant crossed a starting line/point of the event to when the participant crossed a checkpoint or the finish line;

time allotted/remaining to complete one or more laps/segments; and participant status and unofficial information.

The event application executed by the second participant device 324 may calculate total time since the event started and time allotted/remaining to complete each lap, based on event times received from either a checkpoint 131 or second network interface 311 via the WWAN 333. The event application may require the user to manually press a button upon crossing a start line and/or at each checkpoint during instances in which the second participant device 324 does not automatically detect these events. In this scenario, the second participant device 324 may provide automated, albeit unofficial, lap timing information. An added benefit for spectators or other interested parties is that official event data, including participant status, may be uploaded from the event feedback website 341 or directly from the event server 325, such as through end user devices 329. Integrating the event data 304 component with the event feedback 306 component, such as via a first network interface 310 and a second network interface 311, may enable and ensure participants 161 receive official event data, including checkpoint event times if not received from the checkpoint 131. Alternatively or in addition, the first network interface 310 may publish information collected from the participant devices 324 for use as part of the official event data.

Each participant's official event data may include the start time, lap count, start credits, checkpoint event times and/or time to complete a particular event lap/segment as compiled by the event server 325. Information exchanged between the second participant device 324 and the distributed event system 302 may be pushed or pulled. The second participant device 324 may resynchronize data, such as checkpoint event times, lap count/credits, countdown timers (allotted time per interval) at each download via the WWAN 333. Alternatively, the second participant device 324 may resynchronize such data via the checkpoint communications 317 from the individual checkpoint devices 316. Between downloads, the second participant device 324 may calculate and present best known information to the participant 161. Participants wearing the second participant device 324 may thereby benefit by being synchronized with official event timekeeping, specifically official current lap, official timing credits, updated knowledge of time left to complete lap including credits from previous laps or route segments, and definitive knowledge of event status versus other participants 162-165 or versus automated criteria that may disqualify a participant 161.

A multi-venue event integration of an event feedback 306 component with an event data 304 component may enable participants 161-165 to receive the status of the number of people still in the event based upon their current event, the participants in their country/region and the overall world event. The feedback may be personalized such that the participant 161 receives event status pre-designated friends who are participants, for instance. For another example, the participant's GPS location, ranking and physiological data may be uploaded within each lap over the WWAN 333 for sharing and marketing purposes to both the event data 304 component and the event feedback 306 component. An added benefit of the GPS tracking capability in conjunction with the integration of the event data 304 component and the event feedback 306 component is that the official tracking may validate a participant 161 by the tracked route in addition to just intermittent checkpoint data. For example, the validation may prevent fraud by detecting a participant 161 that deviates from the official route. Another example is an instance where the checkpoint device 316 could fail to detect passage of a particular participant 161. In instances where certain communication modalities may be unavailable, certain functions may continue to be provided by the second participant device 324. For example, unofficial timing data may be presented to the participant until a download is available to synchronize with official event information.

In a particular embodiment, the first participant device 171 informs the second participant device 324 when a checkpoint 131 is reached. The second participant device 324 can thus receive a checkpoint communication 317 from the checkpoint device 316 at the checkpoint 131 located along a course of the event, where the checkpoint communication includes a checkpoint identifier and a first checkpoint event time reflecting an official event time value of when the first participant crossed the first checkpoint according to a master clock keeping track of total event time for everyone. Thereby, the second participant device 324 may automatically determine from the event time received from the checkpoint device 316 a checkpoint event time in real-time that reflects their total elapsed event time for that participant 161 since the start of the event. Alternatively, a checkpoint event time can be received from the checkpoint device 316, as well as other information such as starting events, lap events, and/or route segment events. Even without access to WWAN 333, the second participant device 324 may assist the participant with accurate timing.

By providing a checkpoint-based source of tracking and a mobile source of tracking the participant 161 by way of the second participant device 324, the system includes a means of validating event information.

Figure 4:
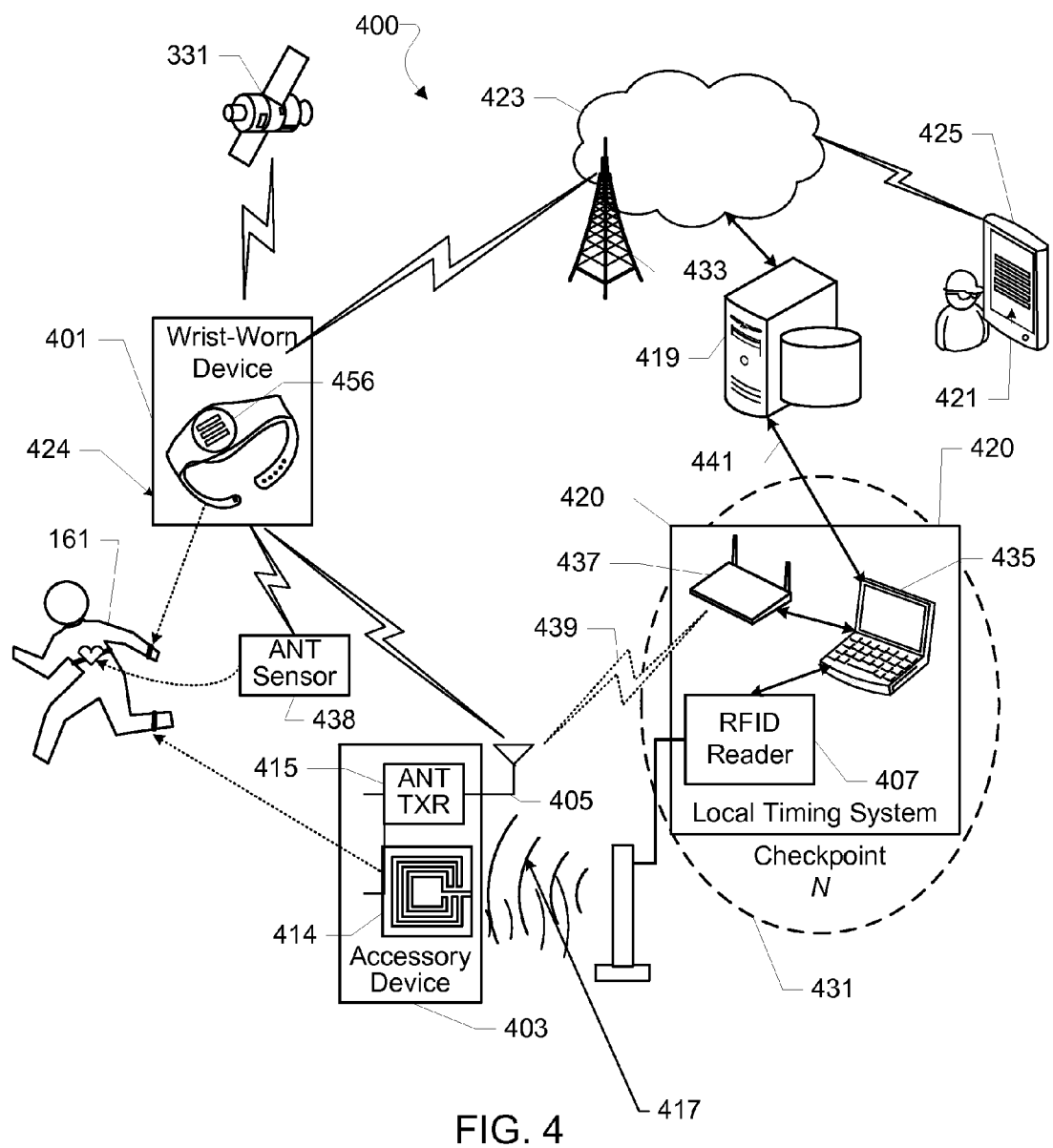
FIG. 4 is a component block diagram of an alternative participant device interacting with an alternative checkpoint device in accordance with various embodiments.

In FIG. 4, in an event feedback system 400, a participant 161 may wear a first participant device in the form of an accessory device 403 formed by a first structure that has an RFID device 414 or transponder and an ANT® transceiver 415, and a second participant device 424 formed by a second structure that includes a wrist-worn device 401 that has multiple radios (WWAN, GPS, ANT®, etc.). The wrist-worn device 401 may be similar to the previously described second participant device 324 but having certain features incorporated into the accessory device 403, which may be wirelessly slaved to the accessory device 403. For instance, the wrist-worn device 401 may receive physiological data from an ANT® sensor 438.

RFID device 414 senses checkpoint crossings with competition-precision timing by detecting the broadcast interrogation by an RFID reader. However, unlike the RFID in a conventional bib/accessory, the accessory device 403 provides the checkpoint time and checkpoint number directly to its ANT® transceiver 415 for broadcast via an antenna 405 to the ANT® transceiver of the wrist-worn device 401. The wrist-worn device 401 presents, such as by displaying on a user interface 456, the checkpoint event time on the wrist-worn device for the event participant to stay attune to their progress in the event.

Since the RFID device 414 in the accessory device 403 operates as a traditional RFID in a participant's bib/accessory, an RFID reader 407 may capture the timing when the participant 161 crosses a checkpoint 431. Thus, the accessory device 403 may be worn with or without a participant's bib/accessory. The accessory device 403 may have an RFID device 214 that is passive until excited by RFID interrogation. Alternatively or in addition, the accessory device 403 may have an active device, depicted as the ANT® transceiver 415 that may mimic the RFID device 214 by responding to the RFID interrogation as well as capturing timing data directly based upon determining a time in which the RFID interrogation occurred. For example, the accessory device 403 may have a timing component that is synchronized at the start of the event or per periodically updated by a checkpoint device that is part of a local timing system 420. Alternatively, an accessory device 403 may have the RFID device 214 that is passive until excited by RFID interrogation and have a device such as the ANT® transceiver 415 that directly detects the RFID interrogation in order to independently determine event timing. For example, the independently determined event timing by the ANT® transceiver 415 may be a fallback should the RFID device 214 fail to communicate with the ANT® transceiver 415.

By allowing both the wrist-worn device 401, in conjunction with the accessory device 403, to capture and transmit the checkpoint event times and the event server to collect the checkpoint event times, the event feedback system 400 may validate the accessory device is accurately capturing the timing or other data for the participant. This may be important in events in which not all participants are wearing the accessory device 403 and wrist-worn device 401. The RFID device 414 and the ANT® transceiver 415 may be directly interfaced to a MCU inside a wearable accessory (such as a foot pod). Alternatively, or additionally the ANT® transceiver 415 may be directly interfaced to GPS-enabled MSM inside of the accessory device 403.

Checkpoint communications with the participant may be executed using a forward link 417 of an RFID reader at the checkpoint 431, which may transmit a checkpoint identifier and an event time to the RFID device 414 inside the accessory device 403. The ANT® transceiver 415 inside the accessory device 403 may transmit the checkpoint identifier and an event time to the wrist-worn device 401. The wrist-worn device 401 may locally store checkpoint communication data and may calculate and store user's times and other performance feedback. The wrist-worn device 401 may provide immediate feedback to the participant 161 when the participant 161 has crossed the checkpoint 431. The wrist-worn device 401 may provide a history of checkpoints crossed and lap times, and distance until the next checkpoint.

The accessory device 403 and wrist-worn device 401 may be paired before an event. The accessory device 403 may be the ANT® master, and the wrist-worn device 401 may be the ANT® slave. The messages sent from master to slave may be broadcast type with the unique ANT® Device ID of the wrist-worn device 401, which was obtained by a previous pairing. Slave does not need to acknowledge broadcast messages.

In one aspect, the accessory device 403 as ANT® master may transmit checkpoint identifier and an event time continuously, such as 4 times a second. Checkpoint identifier and an event time may be updated at the accessory device 403 upon crossing each checkpoint as detected by the RFID device 414, and then held constant until the next checkpoint. However, maintaining a continuous solid channel connection for extended periods with the accessory device 403 may consume a lot of power. Thus, alternatively the accessory device 403 may receive checkpoint identifiers and event times, via the RFID device 414, and then may transmit intermittently as the ANT® master, such as 4-8 times a second for 30 seconds. The wrist-worn device 401 may implement an ANT® background scanning channel to detect the ANT® transmissions.

As a fallback, if the wrist-worn device 401 detects, such as based upon GPS location, that the participant 161 has crossed a checkpoint, but did not receive an updated checkpoint identifier and event time, the wrist-worn device 401 may ping an event server 419 via WWAN 433 to see if the RFID reader 407 received data from the RFID device 414 at that checkpoint 431. The event server 419 may also provide event information 421 via a packet data network 423 to a spectator device 425.

In an embodiment, a local timing system 420 may provide event feedback to the second participant device 424 as an alternative to, or to augment, feedback via WWAN 433. For instance, the local timing system 420 may comprise a computing device 435 that may control an ANT® base station 437 that broadcasts a low power radio signal 439 at or near the checkpoint 431.

For instance, the ANT® base station 437 may be a multi-channel ANT® transceiver that may be directly interfaced to an MCU inside a base station transmitter at each checkpoint 431 of an event. The ANT® base station 437 has network access 441 to the event server 419. The ANT® base station 437 also may have direct access to the data the RFID reader 407 may capture at that checkpoint 431. The ANT® base station 437 broadcasts the forward link (low power radio signal 439) that contains the checkpoint identifier and event time using a participant identifier, which may be a unique ANT® device ID. During event registration, this unique ANT® device ID may be discovered during pairing with the accessory device 403 and then stored in the event server 419 and forwarded to the local timing system 420. Alternatively, the ANT® device ID may be preconfigured for particular accessory devices and/or event timing systems. As a further alternative, the wrist-worn device 401 may be used without the accessory device 403. The wrist-worn device 401 may detect the ANT® base station 437 and transmit the ANTS device ID. Alternatively or in addition, the wrist-worn device 401 may incorporate the RFID device 214.

Once the participant 161 crosses the checkpoint 431, the RFID reader 407 may capture the checkpoint identifier and event time, and may forward this data to the ANT® base station 437. The ANT® base station 437 looks up the ANT® device ID which corresponds to the participant identifier. The ANT® base station 437 may begin to transmit broadcast type messages with the unique ANT® device ID. These broadcast messages contain checkpoint identifier and event time, and could contain lap time and more data. These broadcast messages may be transmitted; for example, the transmission may be continuously repeated 4-8 times a second for at least 2 minutes.

A broadcast channel may be provided for every participant 161 that crosses the checkpoint 431 at a given time. Depending on the size of the event, several 8-channel ANT® transceivers may be needed inside the ANT® base station 437 to scale up the capacity. The ANT® base station 437 may load balance by increasing or reducing the number of channels.

To ensure the user gets an immediate update on their wrist-worn device 401, ANT® broadcast messages may be transmitted as soon as the RFID reader 407 detects that the participant 161 is approaching the checkpoint 408. The ANT® base station 437 may begin to transmit broadcast messages with the unique ANT® device ID immediately, perhaps even before the participant 161 has crossed checkpoint, to expedite the ANT® channel establishment. The ANT® broadcast messages may contain previous checkpoint data or no data if merely establishing the ANT® channel. As soon as the RFID reader 407 detects that the participant 161 has crossed the checkpoint 431, the checkpoint identifier and event time may be forwarded to the ANT® base station 437 that transmit this new data. Thereby, the participant 161 may receive event feedback within 1-2 seconds after crossing the checkpoint 431.

The wrist-worn device 401 may implement an ANT® background scanning channel to detect the ANT® transmissions. Another option is for the wrist-worn device 401 to use GPS to determine that the participant 161 is approaching a checkpoint 431 and command that the ANTS slave (accessory device 403) to start listening/scanning. For example, the accessory device 403 may begin listening/scanning in a search mode within a predetermined distance, such as 150 feet of the checkpoint 431. Prediction of crossing a checkpoint may be based upon a distance calculation or a time calculation, such as based upon historical data captured for a population of participants or for the particular participant 161. As a fallback, if the wrist-worn device 401 detects, such as based on GPS location, that the user has crossed a checkpoint 431 but did not receive an updated checkpoint identifier and event time via ANT® broadcast, the wrist-worn device 401 may ping the event server 419 via WWAN 433 to see if the RFID reader 407 received data from the RFID device 414 at that checkpoint 431.

Figure 5:
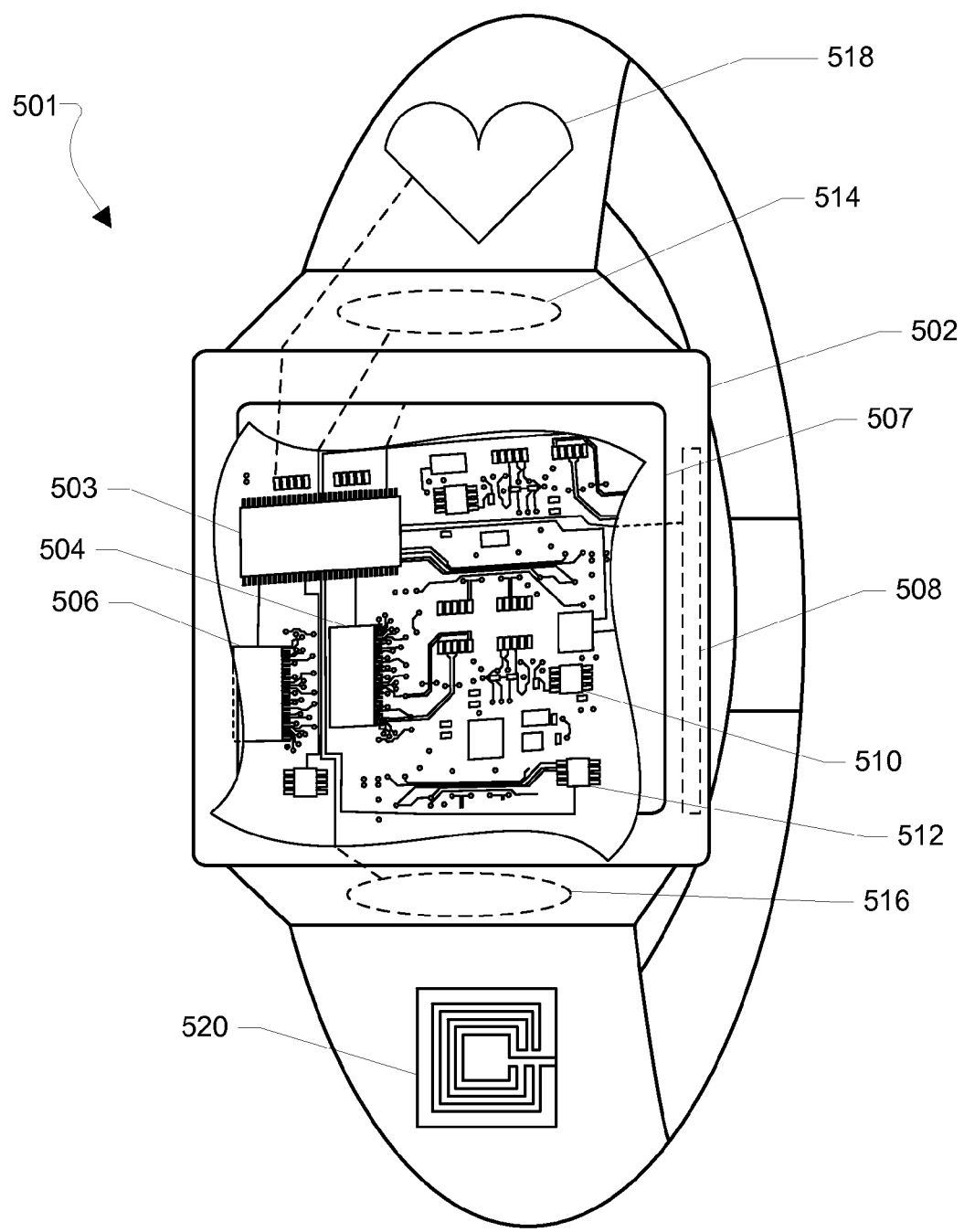
FIG. 5 is a cutaway view of an exemplary participant device of an event feedback system in accordance with various embodiments.

The various embodiments worn or carried by participants 161-165 may be implemented in any of a variety of mobile devices, an example of which is illustrated in FIG. 5. For example, a wrist-worn device 501 that acts as the second participant device 181 (FIG. 1) or a portion of the participant device 424 (FIG. 4) may include a structure 502 capable of holding a processor 503 coupled to internal memories 504 and 506. The structure 502 may include a main bezel and/or a strap (i.e., styled like a watch band) sized to hold the processor 503, memories 504, 506 and other components. Internal memories 504 and 506 may be volatile or non-volatile memories, and may also be secure and/or encrypted memories, or unsecure and/or unencrypted memories, or any combination thereof. The processor 503 may also be coupled to a touch screen display 507, such as a resistive-sensing touch screen, capacitive-sensing touch screen infrared sensing touch screen, or the like. Additionally, the display 507 of the wrist-worn device 501 need not have touch screen capability. Additionally, the wrist-worn device 501 may have one or more antenna 508 for sending and receiving electromagnetic radiation that may be connected to a wireless data link 510 and/or cellular telephone transceiver 512 coupled to the processor 502. The wrist-worn device 501 may also include physical buttons 514 and 516 for receiving user inputs. The wrist-worn device 501 may incorporate a physiological sensor 518, and an RFID device (transponder) 520.

Figure 6:
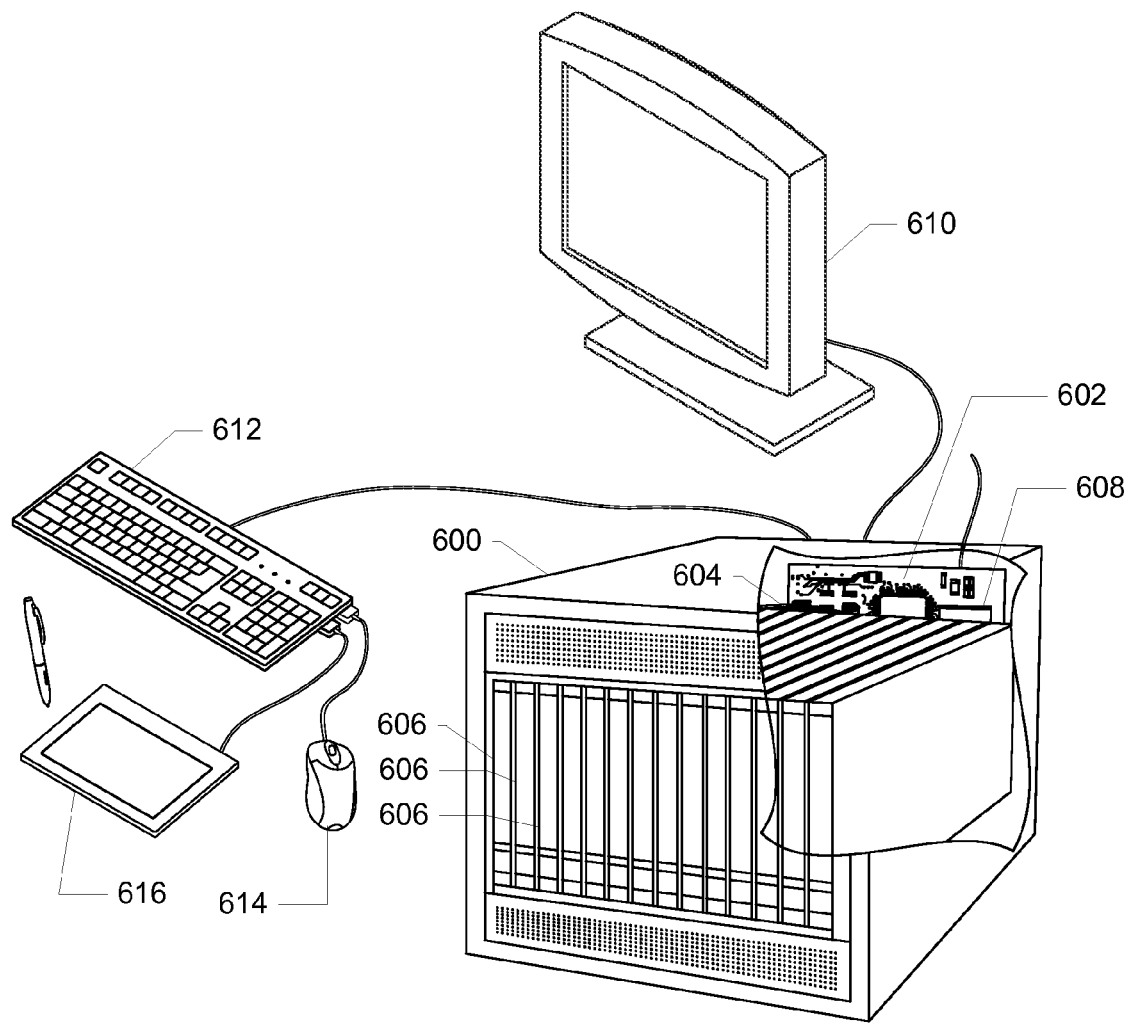
FIG. 6 is a cutaway view of an exemplary event server of an event feedback system in accordance with various embodiments.

The various embodiments may also be implemented on any of a variety of commercially available server devices, such as the server 600 illustrated in FIG. 6. For example, the server 600 may perform the functions of event server 102 (FIG. 1), remote server 339 (FIG. 3), event server 325 (FIG. 3), and event server 419 (FIG. 4). Such a server 600 typically includes a processor 602 coupled to backplane 604 that provides support to a plurality of modules or blades 606 that each volatile memory and a large capacity nonvolatile memory, such as a disk drive. The backplane 604 may provide power, cooling, data bus connections, etc., to the module for blades 606. The server 600 may also include a floppy disc drive, compact disc (CD) or DVD disc drive coupled to the processor 602. The server 600 may also include network access ports 608 coupled to the processor 602 for establishing network interface connections with a network, such as a local area network coupled to other broadcast system computers and servers. The server 600 may include peripheral devices such as a monitor 610, a keyboard 612, a pointing device 614, and a stylus touchpad 616.

Figure 7:
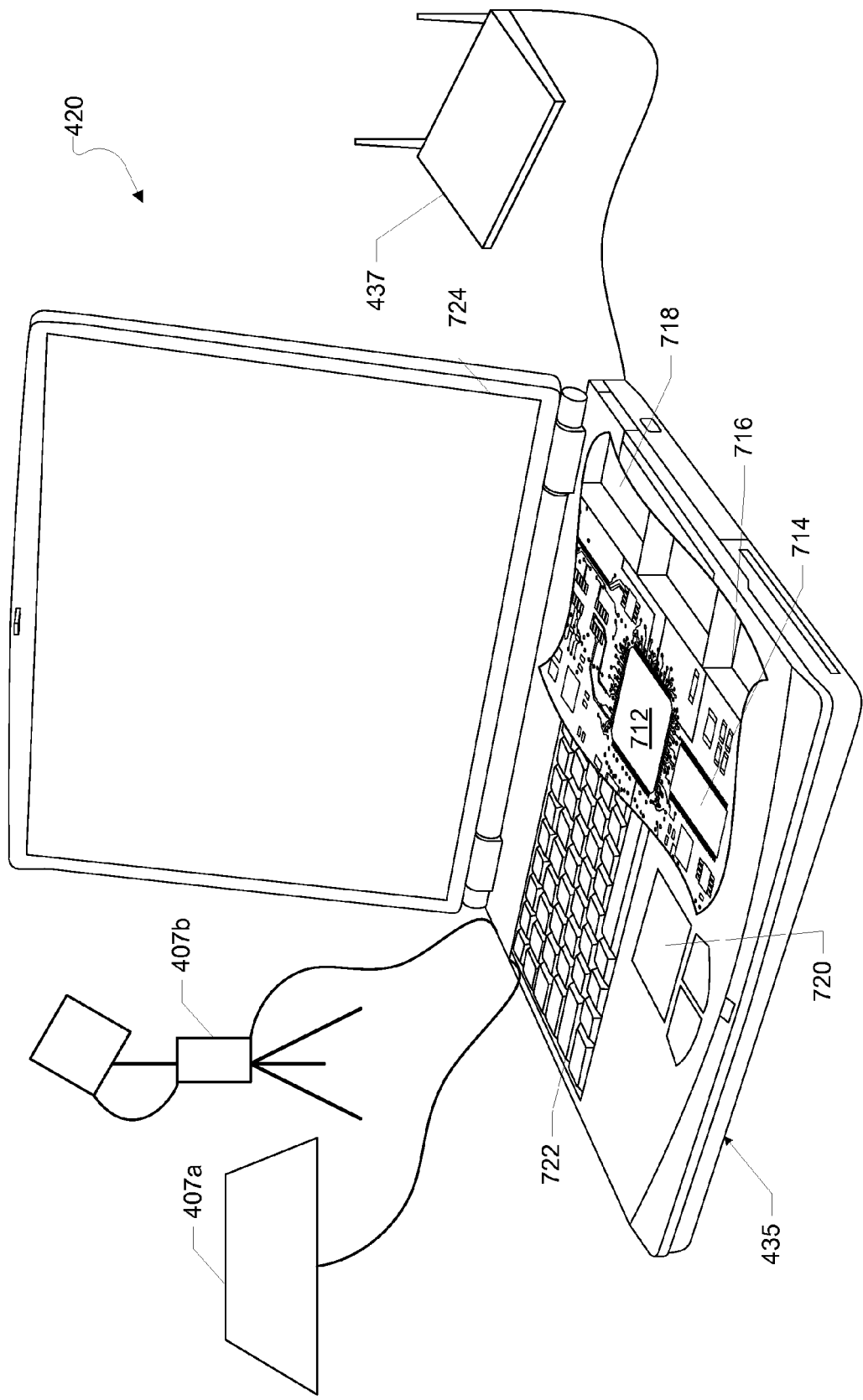
FIG. 7 is a cutaway view of an exemplary timing system of an event feedback system in accordance with various embodiments.

The various embodiments described above may also be implemented within a variety of personal computing devices, such as a local timing system 420 as illustrated as a laptop computer in FIG. 7. For example, the computing device 420 is depicted as configured as part of the local timing system with a shoe mat RFID reader 407a or tower RFID reader 407b and ANT® base station 437. A computing device 435, which may be a laptop computer, will typically include a processor 712 coupled to volatile memory 714 and a large capacity nonvolatile memory, such as a disk drive 716 of Flash memory. The computing device 435 may also include a removable memory interface 718, such as a floppy disc drive or an optical disk drive coupled to the processor 712. The computing device 435 may also include a number of connector ports coupled to the processor 712 for establishing data connections or receiving external memory devices, such as a USB or FireWire® connector sockets, or other network connection circuits for coupling the processor 712 to a network. In a notebook configuration, the computer housing includes a touchpad 720, a keyboard 722, and a display 724 all coupled to the processor 712. Other configurations of the computing device may include a computer mouse or trackball coupled to the processor (e.g., via a USB input) as are well known, which may also be used in conjunction with the various embodiments.

The processor 712 may be any programmable microprocessor, microcomputer or multiple processor chip or chips that may be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they may be accessed and loaded into the processor 712. The processor 712 may include internal memory sufficient to store the application software instructions. In many devices the internal memory may be a volatile or nonvolatile memory, such as flash memory, or a mixture of both. For the purposes of this description, a general reference to memory refers to memory accessible by the processor 712 including internal memory or removable memory plugged into the device and memory within the processor 712 itself.

Figure 8A:
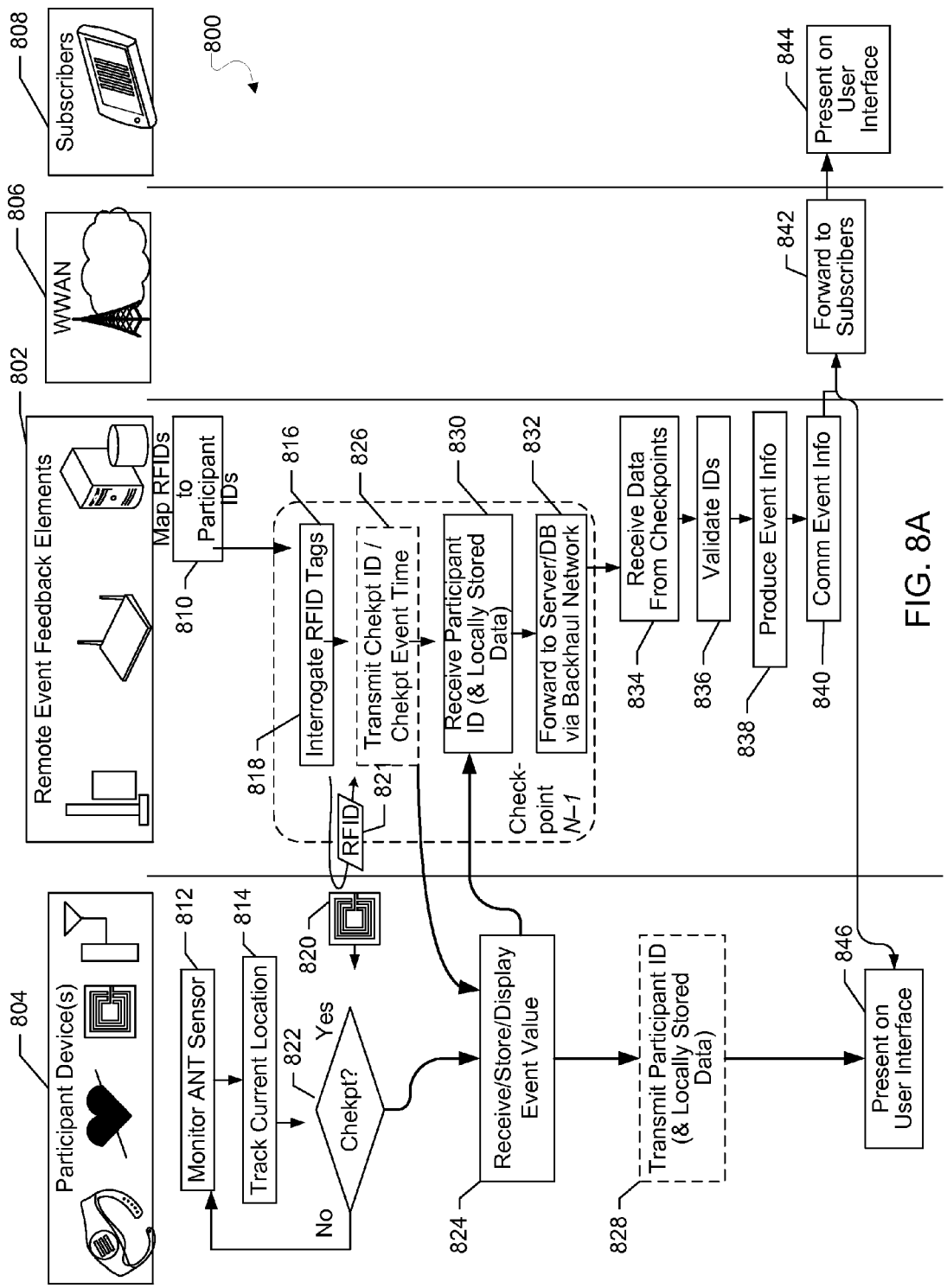
FIGS. 8A and 8B are call flow diagrams of embodiments of a method for presenting feedback information on a participant device.
Figure 8B:
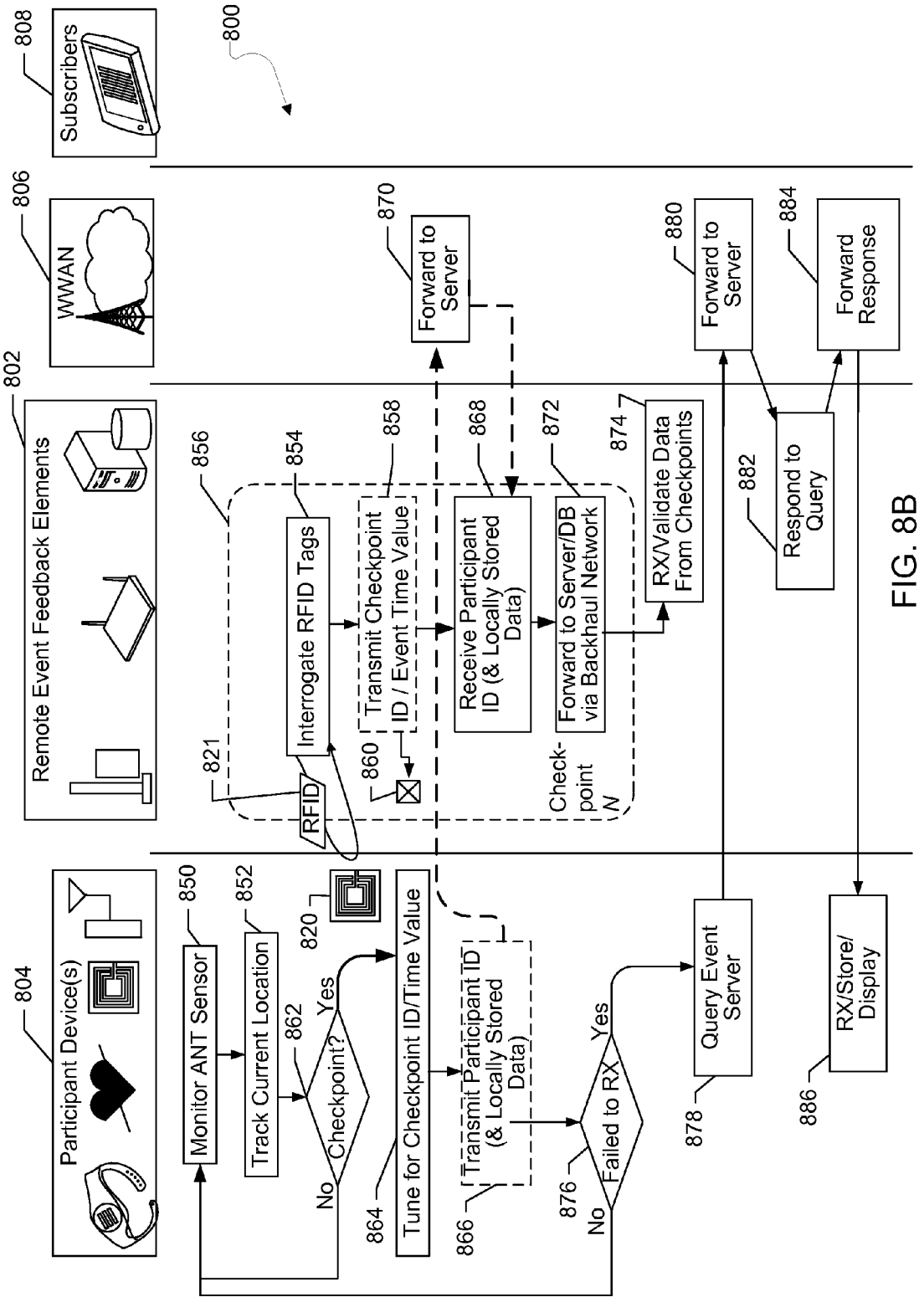

FIGS. 8A-8B illustrates an embodiment call flow diagram 800 performed between remote event feedback elements 802, a participant device 804 that is worn or carried by a participant, a WWAN 806, and subscribers 808 for event feedback. In block 810 of FIG. 8A, the remote event feedback elements 802 maps RFIDs to participant identifiers. In block 812, the participant device 804 monitors an ANT® sensor. In block 814, the participant device 804 tracks current location. In block 816, remote event feedback elements 802 at a checkpoint N−1 818 interrogates an RFID tag 820 that may be worn or carried or worn by the participant. The RFID tag 820 responds with RFID 821.

In an embodiment, a determination by the participant device 804 may be made whether a checkpoint has been passed in block 822 based upon receiving a signal from the RFID tag 820. In response, an unofficial event value may be received, stored and display in block 824. Alternatively, remote event feedback elements 802 may transmit official checkpoint number or ID with the event time value to the participant device 804 in block 826 responds by receiving, storing and displaying the official event value.

In certain implementations, the participant device 804 may transmit locally stored data (e.g., physiological data, unofficial event timing data, etc.) in block 828, which may be received by a local timing system of remote event feedback elements 802 in block 830, which in turn may be forwarded to a server/database of remote event feedback elements 802 via a backhaul network in block 832. The server/database receives data from other checkpoints in block 834. The server/database receives data from other checkpoints, which validates specific participant identifiers and related information in block 836. The server/database produces event-wide information, such as demographic and physiological analysis of participants in block 838. The server/database may communicate the event information to WWAN 806 in block 840. The WWAN may forward the event information to subscribers 808 and participants (via participant device 804) in block 842, which present the event information on a user interface, respectively, in blocks 844, 846.

In block 850 of FIG. 8B, the participant device 804 monitors an ANT® sensor for physiological data. In block 852, the participant device 804 tracks current location. In block 854, remote event feedback elements 802 at a checkpoint N 856 interrogates an RFID tag 820 that may be worn or carried or worn by the participant. The RFID tag 820 responds with RFID 821. In certain embodiments, a base station at or near the checkpoint attempts to transmit the checkpoint ID and event time value to the participant device 804 in block 858. This transmission fails as indicated at 860, such as due to interference. Alternatively, the participant device 804 may fail to determine whether the checkpoint is within range in block 862. For example, the embodiment RFID tag 820 may not be configured to provide a signal to the participant device 804. The participant device 804 may tune to a channel to receive the low power radio broadcast in block 864.

In certain embodiments, the participant device 804 may transmit participant identifier and locally stored data in an ANT® broadcast when in range of the checkpoint N 856 in block 866, which in turn receives the participant identifier and locally stored data in block 868.

Alternatively or in addition, whether or not in a checkpoint or not, the participant device 804 may transmit the participant ID and locally stored data, including checkpoint event times or other data to WWAN 806 in block 866, which in turn forwards that data to an event server in the remote event feedback elements 802 in block 870.

The portion of the remote event feedback elements 802 at checkpoint N 856 may forward in block 872 the checkpoint event time for the particular participant ID, as well as other locally stored checkpoint data to an event server/database (DB) using a communication network, such as a backhaul network. In turn, the event server/DB receives and validates the checkpoint event time for the particular participant ID with data from the participant device 804 in block 874.

In the depicted scenario, the participant device 804 determines whether a failure occurs in receiving a checkpoint event time value from checkpoint N 856 in block 876. If not, processing may return to block 850 in anticipation of an upcoming checkpoint. If failed to receive in block 876, then the participant device 804 queries the event server in block 878, which may be forwarded to the server by WWAN 806 in block 880. The remote event feedback elements 802 responds to the query in block 882. The WWAN 806 forwards the response in block 884 to the participant device 804, which in turn receives, stores, and displays the official event information in block 886. In this way, a participant elapsed time originally displayed on the participant device 804 gets changed in response to receiving event feedback from the remote event feedback elements 802 indicating an official participant elapsed time different from the participant elapsed time originally displayed.

Figure 9:
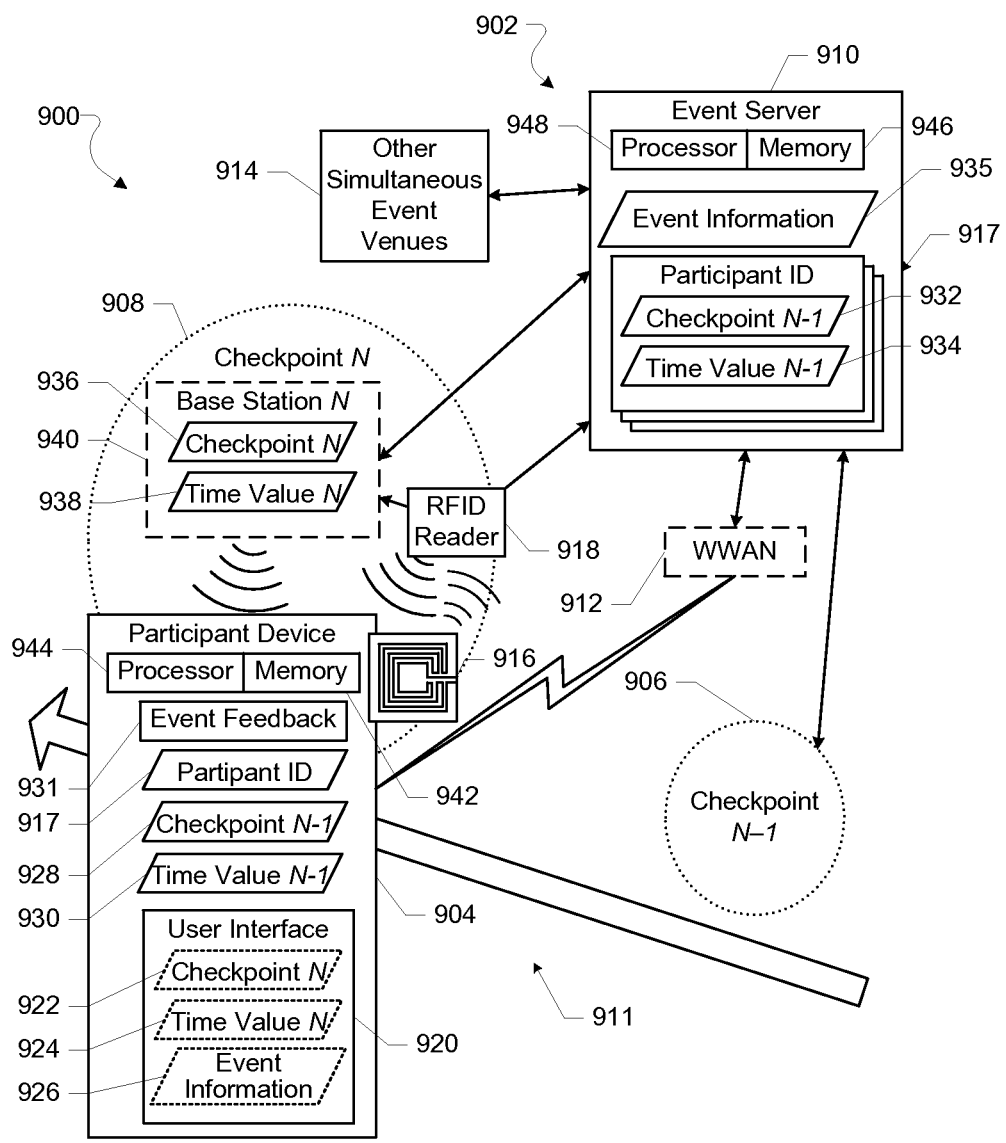
FIG. 9 is a component block diagram of an event feedback system in accordance with various embodiments.

FIG. 9 illustrates a component block diagram of a event feedback system 900, according to an embodiment, an event server 902 tracks event timing for participant device 904. Participants move through checkpoints, which for clarity are depicted as a first checkpoint N−1 906 and a second checkpoint N 908. An event server 910 tracks participants at an event venue 911 by receiving checkpoint event information from the first checkpoint N−1 906 and the second checkpoint N 908. Generally the event server 910 communicates with the checkpoint base stations 940 using a first type of communication network, such as a packet data network (e.g., the Internet). Additionally, the event server 910 receives event feedback and requests via a second type of communication network, such as WWAN 912, from the participant device 904. Thus, participant device 904 communicates with the event server 910 using a second communication network different from the first communication network that may bypass the checkpoints 906, 908. Similarly, the event server 910 may be connected to other simultaneous event venues 914.

Another aspect of the disclosed technologies includes the fact that at least one participant may carry a participant device 904 with a unique participant identifier 916 and the participant device 904 may be configured to transmit the participant identifier 916 to a checkpoint device, depicted as RFID reader 918, at the checkpoint N 908 of the event venue 911. The participant device 904 may be configured to determine a time value based upon the transmitting of the participant identifier, and to calculate event information associated with the participant based upon the time value. A user interface 920 of the participant device 904 may be configured to present the event information, which is depicted as a checkpoint identifier (N) 922, time value (N) 924, and event information 926. The presentation by the user interface 920 may be one or more of visual, audio, and tactile outputs.

In one aspect, the participant device 904 maintains event information for checkpoints that have been reached, such as a checkpoint identifier (N−1) 928 and a time value (N−1) 930, which may be an unofficially detected at the participant device 904. From this data, real-time event feedback 931 may be calculated. Alternatively or in addition, the checkpoint identifier N−1 932 and time value N−1 934 that corresponds to the participant identifier (ID) 917 may be pushed or pulled via WWAN 912 from the event server 910. Other types of event information 935 may also be maintained by and disseminated from the event server 910. For example, other types of event information 935 may include an official event time, which is maintained by the event server 910 with time update values regularly distributed to checkpoints for maintaining local checkpoint time values that are synchronized with the official event time. Alternatively or in addition, an official checkpoint identifier N 936 and a checkpoint event time based on a time value N 938 may be locally pushed or pulled from the checkpoint N 908 base station N 940 to the participant device 904. The time value N 938 may be independently determined by the checkpoint N 908 using a local clock or regularly synchronized at the checkpoint N 908 with the event server 910 official event time. Once a participant carrying the participant device 904 comes in range of the base station N 940, a time value N 938 associated with the particular checkpoint identifier 936 and participant identifier 917 is pushed or pulled to the event server 910 and stored under the participant identifier 917 along with a checkpoint N−1 932 identifier and a time value N−1 934. Also, base station N 940 transmits the checkpoint N 936 identifier and the time value N 938 to the participant device 904 for instantly displaying a checkpoint event time on the participant device along with real-time event feedback 931 as the participant passes the checkpoint.

In certain embodiments, the participant device 904 has non-transitory computer-readable medium, depicted as memory 942, having stored thereon processor-executable instructions configured to cause a processor 944 to perform operations, comprising: transmitting, by a participant identifier worn or carried by a participant, a participant identifier to a checkpoint device at a checkpoint of an event venue; determining, by a participant device 904 worn or carried by the participant, a time value based upon the transmitting of the participant identifier; calculating event information associated with the participant based upon the time value; and presenting the event information on a user interface 920 of the participant device 904.

Exemplary embodiments transmit the participant identifier by transmitting an RFID signal by the participant identifier in response to the checkpoint device comprising an RFID reader. The time value may be determined by detecting interrogation of the participant identifier by the RFID reader 918.

In various embodiments, the participant device calculates the event information by determining a timing requirement for continued event participation by the participant. The event feed then calculates the event information comprising a timing target based upon the time value for the participant to satisfy the timing requirement.

In addition, the participant identifier 916 may transmit the participant identifier to the checkpoint device to generate an official time value associated with the participant. The participant device receives the official time value by the participant device via a WWAN. The event feedback information may contain an event status of a participant.

Rather than WWAN, the participant device 904 may receive the official time value via a low power radio broadcast. In particular, the participant device 904 may monitor for the low power radio broadcast by a base station 940 configured to use ANT® communication protocol and may detect the official time value and the participant identifier contained in the low power radio broadcast.

Various embodiments of the participant device 904 may detect or determine current location, such as by receiving GPS signals. For instance, the participant device 904 may then determine route guidance based upon the current location and route information and present the route guidance on the user interface of the participant device. Alternatively, the device location may be estimated based upon historical performance timing. Alternatively, the participant device may determine whether the checkpoint device (base station 940) should be within range based upon the current location and route information. The participant device 904 may activate a receiver of the participant device configured to receive an official time value in response to determining being with range. In certain embodiments, the receiver comprises a wireless wide area network receiver. Alternatively, the receiver comprises an ANT® receiver.

In certain embodiments the participant device detects a value of physiological data of the participant, and may transmit the physiological data value to an event server.

In certain embodiments, the event server 902 provides event feedback to participants in an event. A checkpoint device (RFID reader 918 or base station 940) may be configured to receive, at a checkpoint 908 of an event venue 911, a signal containing a participant identifier (ID) 917 from a participant identifier worn or carried by a participant. An event server 910 may be configured to determine an official time value based upon the receiving of the participant identifier. A transmitter (WWAN 912 or base station 940) may be configured to transmit the official time value to a participant device 904 worn or carried by the participant for presenting on a user interface 920.

In an embodiment of the participant device 904, non-transitory computer-readable medium (memory 946) having stored thereon processor-executable instructions is configured to cause a processor 948 to perform operations, including receiving, by a checkpoint device at a checkpoint of an event venue, a signal containing a participant identifier from a participant device; determining an official time value based upon the receiving of the participant identifier; and transmitting the official time value to another participant device worn or carried by the participant for presenting on a user interface.

In particular, the event feedback system 900 receives official time values for a plurality of participants from checkpoint devices at more than one event venue. In certain embodiments, the checkpoint device comprises an RFID reader 918 that interrogates the participant identifier 916 (RFID device). In certain implementations, the event has timing requirements for each participant to meet or ranking levels they must maintain over segments of the event. The event server 902 may calculate the event status for the participant based upon the official time value and the timing requirement.

The event server 902 may transmit the official time value to the participant device via a wireless wide area network 912. Alternatively, the event feedback system may transmit the official time value to the participant device via a low power radio broadcast by a base station 940, such as via an ANT® communication protocol. The event server 902 may distribute route information to the participant device 904. The event server 902 may receive physiological data of the participant and transmit the physiological data via a communication network for presenting on a user interface 920.

Figure 10:
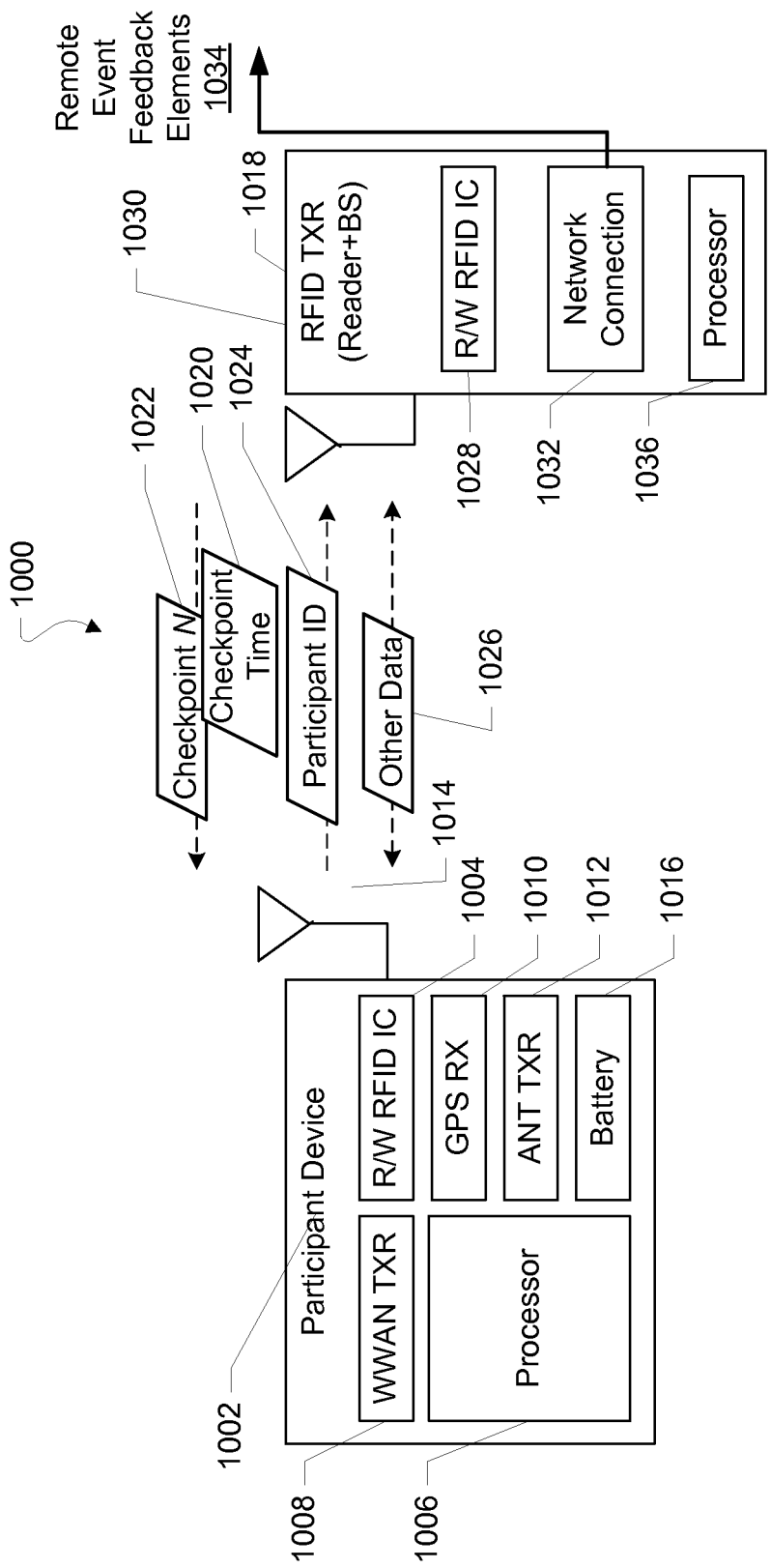
FIG. 10 is a system block diagram of an event feedback system having a participant device with an integrated participant identifier.

FIG. 10 is a component block diagram of an event feedback system 1000 having a participant device 1002 with an integrated participant identifier, depicted as a read/write (R/W) RFID integrated circuit (IC) 1004. The participant device 1002 for example may be attached to a user and used in a manner similar to other fitness devices, such as a sports watch or MP3 player, although some embodiments may be carried or worn in other manners. The participant device 1002 may have a processor 1006 that may be configured with processor-executable instructions to execute applications for fitness and route tracking and event feedback. The participant device 1002 may communicate via a WWAN transceiver (TXR) 1008, the R/W RFID integrated circuit 1004, a GPS receiver (RX) 1010, and a ANT® transceiver 1012 that transmit and receive via one or more antennas 1014. The participant device 1002 may have a portable power supply, such as a battery 1016.

WWAN transceiver 1008 may provide access to voice and data communication, GPS receiver 1010 enables location tracking, ANT® transceiver 1012 may captures fitness data from wireless ANT® accessories, and R/W RFID integrated circuit 1004 may capture track checkpoint event timing. In total, the participant device 1002 may provide a fitness and racing product that enhances activities performed by the participant or user. For example, with GPS and ANT®, the participant device 1002 may capture and analyze workout data for runners, cyclists, hikers, etc. (pace, distance, heart rate, calories, laps, power, revolutions per minute (RPM), speed and elevation). With these fitness features, the device may be used for racing and training year-round.

Integrating the RFID capability into participant device 1002, such as a wrist-worn device may allow an event organization to replace a conventional RFID bib/accessory for the event participant with the participant device 1002. The RFID integrated circuit 1004 may be functionally identical to the RFID in the conventional bib/accessory in one aspect. The RFID integrated circuit 1004 may sense RF signals emitted by RFID readers at checkpoint crossings with competition-precision timing by detecting a broadcast from an RFID transceiver, depicted as an RFID reader/base station 1018. However, unlike the RFID in the conventional bib/accessory, the R/W RFID integrated circuit 1004 is integrated with the processor 1006, which may enable real-time display of checkpoint event time on the participant device 1002 for the event participant to stay attune to their progress in the event. The RFID reader/base station 1018 may transmit checkpoint time 1020 and checkpoint number 1022 to the participant device 1002, which in turn may calculate lap time between checkpoints. All previous checkpoint and lap times may also available for presenting visually, aurally, or haptically on the participant device 1002.

The participant device 1002 may be pre-loaded with an application that includes course information, and may correspond each checkpoint number/identifier with its physical location (geographic, relative elevation, relative distance, etc.) on the course. The participant device 1002 may also have the participant's pace information and may overlay this information on the course in real-time. If there is a goal time for each lap, the participant device 1002 may have this information preloaded. If the lap goal times are dynamically changing, the participant device 1002 may be updated real-time via WWAN, or received from the RFID reader/base station 1018 at the checkpoint when the participant is within range. In return, the participant device 1002 may transmit participant identifier (ID) 1024. The participant device 1002 and RFID reader/base station 1018 may wirelessly exchange other data 1026. To that end, the RFID reader/base station 1018 may incorporate an R/W RFID integrated circuit 1028 that transmits and receives via one or more antennas 1030, a network connection 1032 to a remote event system 1034, and a processor 1036 to execute checkpoint processes. The remote event system 1034 may represent both the checkpoints and the event server of other embodiments.

The RFID integrated circuit 1004 may operate at a conventional low frequency of 125 kHz for backward compatibility at close proximity with passive RFID tags or an ultra-high-frequency (UHF) frequency of 900 MHz for mast RFID antenna systems. The low frequency (LF) RFID operating frequency range is 120-150 kHz. The LF transponder may be passive with a read range limited to 4 inches. The UHF RFID operating frequency range is 860-960 MHz (North America, Europe, and Japan). Depending on whether the UHF transponder is passive, semi-passive or active, the read range varies between 20-100 feet. Multiple readers and antennas may be used to improve the read success rate, to increase timing accuracy, and to scale up for capacity. A typical reader reads a transponder's data multiple times to decrease the chance of bit errors in the received data. In a multi-reader/multi-transponder environment, communications between readers may be synchronized and divided in both time and frequency to avoid reader collisions.

In some embodiments, the R/W RFID integrated circuit 1004 in the participant device 1002 may operate as the conventional RFID in a participant's bib/accessory. In such instances, the RFID readers at checkpoint crossings may capture the participant's timing by reading the participant ID 1024 from the participant device 1002. For events in which not all participants are wearing the participant device 1002, the other participants may wear a traditional RFID bib/accessory that is compatible with the RFID readers, such as by operating on the same frequency, and the event server, such as by using compatible data formats.

In addition, the participant device 1002 may use the WWAN transceiver 1008 to communicate the captured timing data to an official event timing system (remote event system 1034) and retrieve the event status and position in the event for the participant. Event information including statistics may also be retrieved that may be interesting to the participant, such as their position within their age/gender event class overall, how much distance between them and next competitor, first place runner, friend, etc.

In specific embodiments, combining the official event timing with physiological data captured by the ANT® transceiver 1012 and other sensors on the participant device 1002 as well as enabling the transmission of that data via WWAN communication provides the ability to share interesting statistics about participant's pace, heart rate, location, event position, lap timing, etc., with family and friends via an application for spectators, enhancing spectator experience.

Figure 11:
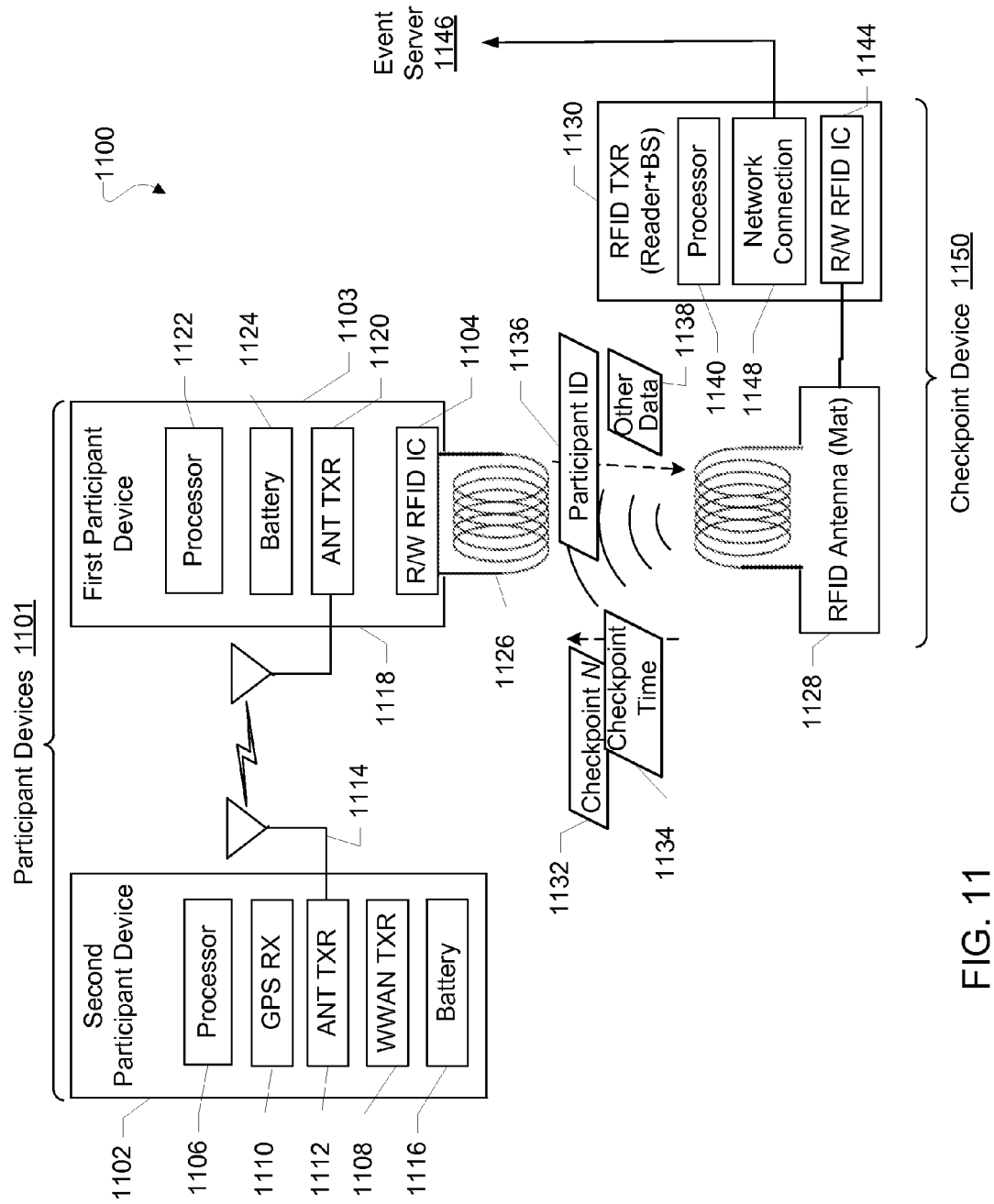
FIG. 11 is a system block diagram of an event feedback system having participant devices in accordance with various embodiments.

FIG. 11 is a component block diagram of an event feedback system 1100 having operatively coupled participant devices 1101, including a first participant device 1103 (e.g., an accessory such as a foot pod device attached to the laces of a runner's shoe) and a second participant device 1102 (e.g., a wrist-worn device). The first participant device can maintain a participant identifier using the incorporated R/W RFID integrated circuit 1104. Also, the second participant device 1102 may have one or more processors 1006 that may execute applications for fitness and route tracking and event feedback. The second participant device 1102 may communicate via a WWAN transceiver 1108, a GPS receiver 1110, and ANT® transceiver 1112 that transmit and receive via one or more antennas 1114, for example at a 2.4 GHz frequency. The participant device 1002 may be have a portable power supply, depicted as a battery 1116. The second participant device 1102 may perform functions described above with reference to FIG. 10 for participant device 1002.

The first participant device 1103 may have one or more antennas 1118 for an ANT® transceiver 1120 to communicate with the second participant device 1102 under the control of one or more processors 1122 and powered by a power supply, depicted as battery 1124. For example, the first participant device 1103, in the form of a foot pod, may be attached to a shoe for being close to a ground-mounted checkpoint sensor. For clarity, the R/W RFID integrated circuit 1104 is depicted as a passive device that is excited (inductively coupled) at a low frequency antenna 1126 by an LF RFID signal of 125 kHz from an RFID antenna (mat) 1128 of an RFID transceiver (reader/base station) 1130 that may also transmit a checkpoint number 1132 and checkpoint time 1134. In response, the first participant device 1103 may transmit a participant identifier (ID) 1136. The first participant device 1103 and the RFID transceiver (reader/base station) 1130 may also exchange other data 1138. To that end, the RFID transceiver (reader/base station) 1130 has a processor 1140 that may be configured to control the RFID antenna (mat) 1142 via an R/W RFID integrated circuit 1144 and that may communicate with an event server 1146 via a network connection 1148. A checkpoint device 1150 may be formed by the RFID antenna (mat) 1142 and RFID TXR (reader/base station) 1130.

In an exemplary embodiment, the ANTS communication protocol may be used between the second participant device 1102 and the first participant device 1103. Alternatively or in addition, other communication protocols may be used. In this embodiment, the first participant device 1103, second participant device 1102, and any other ANT® devices may be wirelessly paired or preconfigured ahead of time, such as before an event or before being in proximity to other potentially conflicting ANT® devices. The first participant device 1103 may be the ANT® master and the second participant device 1102 may be the ANT® slave. The ANT® master may control the channel, which is a logical connection between ANT® nodes. The ANT® master may configure the channel, initiate communication, transmit data at a certain channel period (0.5-200 Hz), and keep the channel synchronized. Channel configuration involves setting several parameters such as channel period, channel RF frequency (78 available), channel type, and network type. A channel ID may also be set, which may include transmission type, device type and a unique device number. A common channel configuration may be required for two ANT® devices to communicate. Some channel parameters may be set prior to opening a channel, but most parameters may be changed while the channel is open. The channel configuration and channel ID may be controlled by the master and sent with every broadcast message. The slave searches for messages with a channel configuration common to its own, may establish a channel when it finds a match and synchronizes to the master.

The messages sent from the master to the slave (e.g., first participant device 1103 to second participant device 1102) are broadcast type, and the slave does not need to acknowledge. The values of all channel configuration parameters may be defined and known ahead of time by both the second participant device 1102 and first participant device 1103, except for the unique device number. Each first participant device 1103 has a unique device number, which the second participant device 1102 may obtain by pairing in an isolated space. During pairing, the slave may use a wildcard value when searching to obtain the unique device number of the master. Once the second participant device 1102 obtains the device number of the first participant device 1103, it may receive broadcast messages from the first participant device 1103. The second participant device 1102 will reject messages from all other accessories. This is how multiple participants may coexist in close proximity without unintentionally receiving messages from another participant's accessory. Due to the low-power, short range and time-duplexing nature of the ANT® protocol, the standard specifies that 80 transmitters within a 10 meter radius will co-exist without performance loss. That is for ANT® devices on the same RF frequency channel, transmitting four (4) messages per second, the ANT® protocol provides 78 RF frequency channels available which could be utilized to scale up the number of close-proximity users, and allow an even denser cluster of ANT® transmitters.

The first participant device 1103 and second participant device 1102 may maintain an ANT® channel throughout the entire event. Checkpoint time and checkpoint number may be updated at the first participant device 1103 upon crossing checkpoint via RFID, and then may be held constant until the next checkpoint. The accessory transmits checkpoint time and checkpoint number continuously at a message rate of four (4) times a second. In each broadcast message, there are eight (8) bytes of data payload which contain that information, and are decoded by the wrist-worn device. The data format of the 8-byte payload are defined ahead of time and known by both the first participant device 1103 and second participant device 1102. The participant ID 1136 may also be contained in the 8-byte data payload as a redundant check to ensure the participant is receiving the correct data.

As a fallback, if the second participant device 1102 detects (based on GPS location) that the participant has crossed a checkpoint, but did not receive an updated checkpoint time and checkpoint number, the second participant device 1102 may ping a database of the event server 1146 via WWAN to see if the RFID TXR (reader/base station) 1130 received data from the first participant device 1103 at that checkpoint. The second participant device 1102 may receive the updated checkpoint identifier and checkpoint event time via WWAN.

Figure 12:
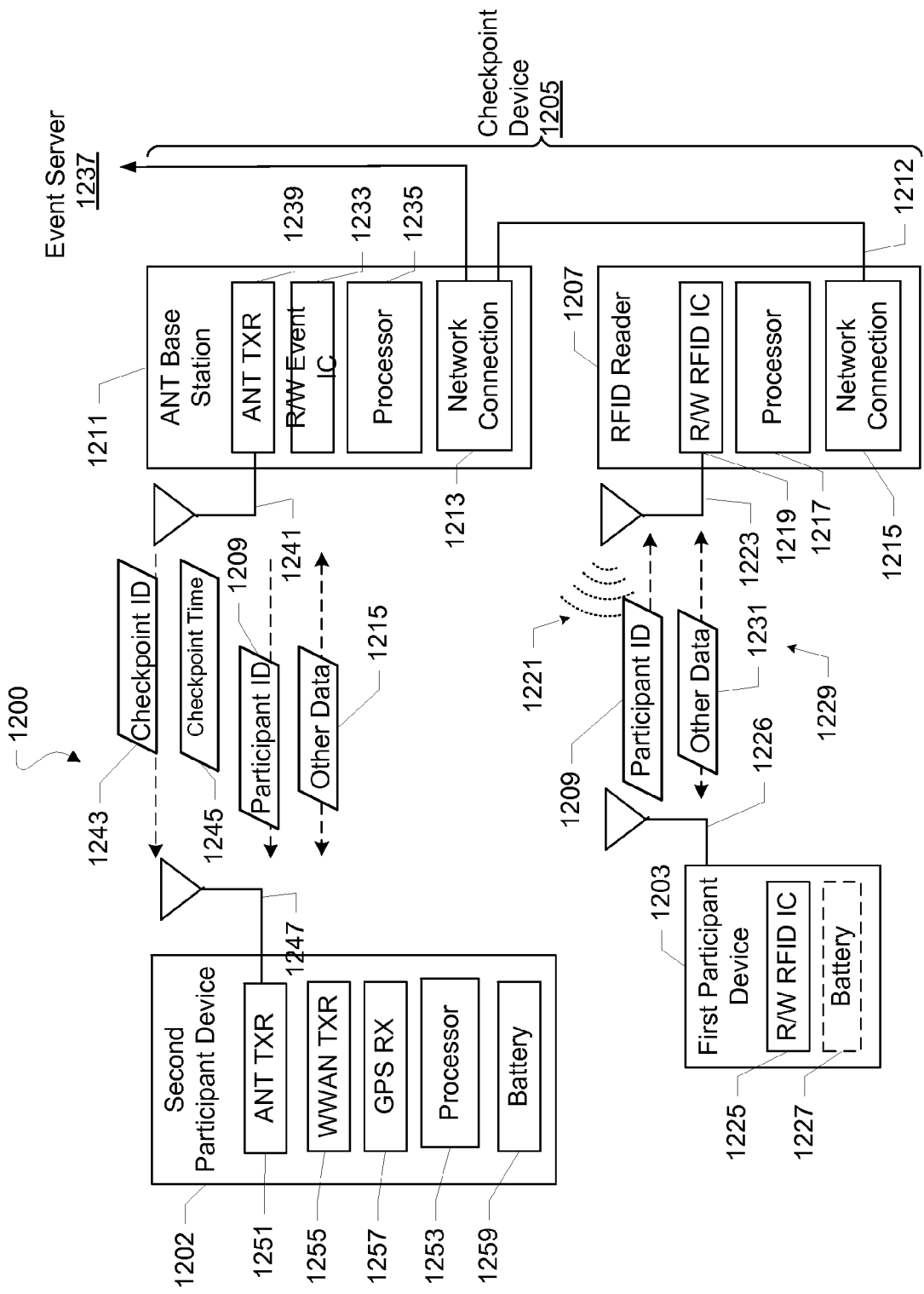
FIG. 12 is a system block diagram of an event feedback system having a participant device with an autonomous participant identifier.

FIG. 12 is a component block diagram of an event feedback system 1200 having a second participant device 1202 with an autonomous first participant device 1203 with participant identifier, which may be a transponder (bib tag), either worn or carried by a participant. A checkpoint device 1205 may include an RFID reader 1207 that obtains a participant identifier 1209 from the first participant device 1203 and an ANT® base station 1211 that exchanges event information with the second participant device 1202. The ANT® base station 1211 and RFID reader 1207 may be integrated or separate components interfaced via a connection 1212 between respective communication network connections 1213, 1215.

For clarity, the RFID reader 1207 may incorporate one or more processors 1217 that cause an R/W RFID integrated circuit 1219 to transmit RFID communication at a UHF 900 MHz frequency on a forward channel 1221 from one or more antennas 1223. The first participant device 1203 may contain an R/W RFID integrated circuit 1225 that is energized by the forward channel 1221 or alternatively by a power supply, depicted as a battery 1227. The R/W RFID integrated circuit 1225 may transmit the participant identifier 1209 on a reverse channel 1229 to the RFID reader 1207. The first participant device 1203 and RFID reader 1207 may exchange other data 1231.

In this embodiment, the second participant device 1202 does not locally receive information from the first participant device 1203. Instead, the ANT® base station 1211 of the checkpoint device 1205 may include a checkpoint integrated circuit or application 1233 executed by one or more processors 1235 that may determine the event information that should be transmitted to the second participant device 1202 as well as to a remote event system 1237. For example, an ANT® transceiver 1239 may transmit via one or more antennas 1241 a checkpoint identifier 1243, checkpoint time 1245 and the participant identifier 1209 that is received at one or more antennas 1247 for an ANT® transceiver (TXR) 1251 of the second participant device 1202.

The second participant device 1202 for example may be attached and user interacted with in a manner similar to a fitness device or sports watch, although certain embodiments may be carried or worn in other manners. The participant device 1202 may have one or more processors 1253 that may execute applications for fitness and route tracking and event feedback. The second participant device 1202 may communicate via a WWAN transceiver 1255, and a GPS receiver 1257. The second participant device 1202 may be have a portable power supply, depicted as a battery 1259. The second participant device 1202 may perform functions described above with reference to FIG. 10 for second participant device 1002.

In an exemplary embodiment, the second participant device 1202 may be an ANT® device that may be paired to the ANT® base stations 1211. During event registration, each second participant device 1202 may be given the ANT® channel configuration parameters and their user's participant ID, which may be communicated over ANT® or WWAN wireless data links. The ANT® TXR 1251 may then establish a channel and receive broadcast messages from the ANT® base stations 1211 throughout the course. The second participant device 1202 may decode the payload data of the ANT® broadcast messages, which may contain the user's unique participant ID 1209 and corresponding checkpoint time 1245 and checkpoint number 1243 after the participant crosses a checkpoint.

The ANTS base station 1211 may be the ANT® master, and the second participant device 1202 may be an ANT® slave, and may be configured in a manner similar or identical as described above with reference to FIG. 11. For example, the ANT® master may control the channel, which is a logical connection between the ANT® nodes. The ANT® master may configure the channel, initiate communication, transmit data at a certain channel period (0.5-200 Hz), and keep the channel synchronized. Channel configuration may involve setting several parameters such as channel period, channel RF frequency (78 available), channel type, and network type. A channel ID may also be set, which may include transmission type, device type and a unique device number. A common channel configuration may be required for two ANT® devices to communicate. Some channel parameters may be set prior to opening a channel, but most parameters may be changed while the channel is open. The channel configuration and channel ID may be controlled by the ANT® master and sent with every broadcast message. The ANT® slave may search for messages with a channel configuration common to its own, establish a channel when it finds a match and synchronize to the ANT® master. The ANT® master may broadcast messages which are received by many ANT® slaves (one-to-many network topology). The slaves do not need to acknowledge such broadcast transmissions.

Various embodiments may be scaled up to support more than 100,000 second participant devices 1202. For example, the configurable parameters that may be utilized to scale the system capacity may include device number, channel frequency, and channel period. Each ANT® base station 1211 may support eight (8) ANT® broadcast channels (or eight (8) ANT® masters). Several ANT® base stations 1211 may be deployed near the checkpoints to increase the number of ANT® masters. At a given checkpoint, each ANT® master may have a unique device number. The ANT® master may configure their channels to operate on different RF frequency channels. As mentioned above, the ANT® protocol has 78 RF frequency channels available which may be utilized to scale up the number of close-proximity users. The nature of the ANT® protocol is time duplexed, and the event feedback system 1200 may divide messages in frequency and by device number. The ANT® protocol specifies that 80 transmitters within a 10 meter radius will co-exist without performance loss given that ANT® devices on the same RF frequency channel are transmitting four (4) messages per second. A direct theoretical calculation would suggest almost 25,000 messages per second using 780 base station in a 10 meter radius may be achieved, which is far more than the event feedback system 1200 may require.

Each second participant device 1202 may search for broadcast messages with a common channel configuration as the parameters assigned at event registration. As soon as the participant crosses a checkpoint, the RFID reader 1207 may forward the checkpoint event time/checkpoint number/participant ID to the ANT® base station 1211. The ANT® base station 1211 may also look up the channel configuration assigned to that participant, which may be remotely stored in the event server (including remote event system 1237). The number of ANT® masters per checkpoint may be scaled to support the number of event participants. Each ANT® master (ANT® base station 1211) at a given checkpoint has a distinct channel configuration. The number of available channel configurations equals the number of ANT® masters per checkpoint. Each available channel configuration may be distributed equally across all event participants. Many event participants' second participant devices 1202 may have the same channel configuration. The second participant devices 1202 that have identical channel configuration may search and establish a channel with the same ANT® master upon approaching the ANT® base stations. The ANT® masters will interleave user's data as the participants cross the checkpoint. In each broadcast message, there may be eight (8) bytes of data payload which are decoded by the second participant device 1202. The data format of the 8-byte payload is defined ahead of time and known by the ANT® base stations 1211 and wrist-worn devices. Each 8-byte data payload contains the participant ID, checkpoint time and number of one or more user. Although several second participant devices 1202 may receive and decode the broadcast messages with their assigned channel configuration, the second participant devices 1202 may only update its user's checkpoint time when it decodes its user's participant ID 1209.

In the interest of latency, the ANT® masters may transmit each event participant's data at least two times a second. If the ANT® master (ANT® base station 1211) transmits an event participant's data less frequently, then the latency would increase, and the user's second participant devices 1202 may not provide instantaneous feedback. Instead it may take several seconds. The event feedback system 1200 may load balance to minimize inference and maximize the redundancy of each event participant's data. For example, the user's channel configuration which was assigned at event registration may be dynamically changed via WWAN during the event for load balancing purposes. For instance, the event feedback system 1200 may detect a large group of second participant devices 1202 with the same channel configuration crossing one or more checkpoints at the same time.

Since the checkpoints may be separated much further than an ANT® radio's range of 10 meters, each checkpoint's cluster of ANT® base stations may repeat the channel configuration. So each second participant devices 1202 may keep the same channel configuration throughout the event course. At each checkpoint, the second participant devices 1202 may search, establish a channel and received broadcast messages from an ANT® master with the common channel configuration. The second participant devices 1202 may reject messages from all other ANT® masters. Thus, many second participant devices 1202 may coexist in close proximity without unintentionally receiving messages from another ANT® master.

The second participant devices 1202 may implement an ANT® background scanning channel to detect the ANT® broadcasts messages with a common channel configuration. Another option is for the second participant devices 1202 to use GPS to determine when the user is approaching a checkpoint and command the ANT® slave to start searching. The second participant devices 1202 may begin searching within 150 feet of the checkpoint. Yet another option would be for the second participant devices 1202 to maximize the search time and re-initiate searches after a search times out, possibly putting the second participant devices 1202 in search mode the entire length between checkpoints until within range of a checkpoint base station.

As a first example, an ANTS base station 1211 may have the following capacity:

Two (2) participant's data per 8-byte data payload in a broadcast message;

Eight (8) broadcast messages per second per ANT® master;

Eight (8) ANT® masters per ANT® base station;

One (1) ANT® base station per checkpoint;

Repeat a participant's data every 4th broadcast message; and

Support sixty-four (64) user's, receiving their data two (2) times a second.

As a second example, an ANT® base station 1211 may have the following capacity:

Two (2) participant's data per 8-byte data payload in a broadcast message;

Eight (8) broadcast messages per second per ANT® master;

Eight (8) ANT® masters per ANTS base station;

Four (4) ANT® base stations per checkpoint;

Repeat a participant's data every 4th broadcast message; and

Support 256 participants, receiving their data two (2) times a second.

As a third example, an ANT® base station 1211 may have the following capacity:

Three (3) participant's data per 8-byte data payload in a broadcast message;

Eight (8) broadcast messages per second per ANT® master;

Eight (8) ANT® masters per ANT® base station;

Four (4) ANT® base stations per checkpoint;

Repeat a participant's data every fourth broadcast message; and

Supports 384 participants, receiving their data two (2) times a second.

Note: in these examples, all channels may be on the same Radio Frequency (RF) frequency channel.

Figure 13:
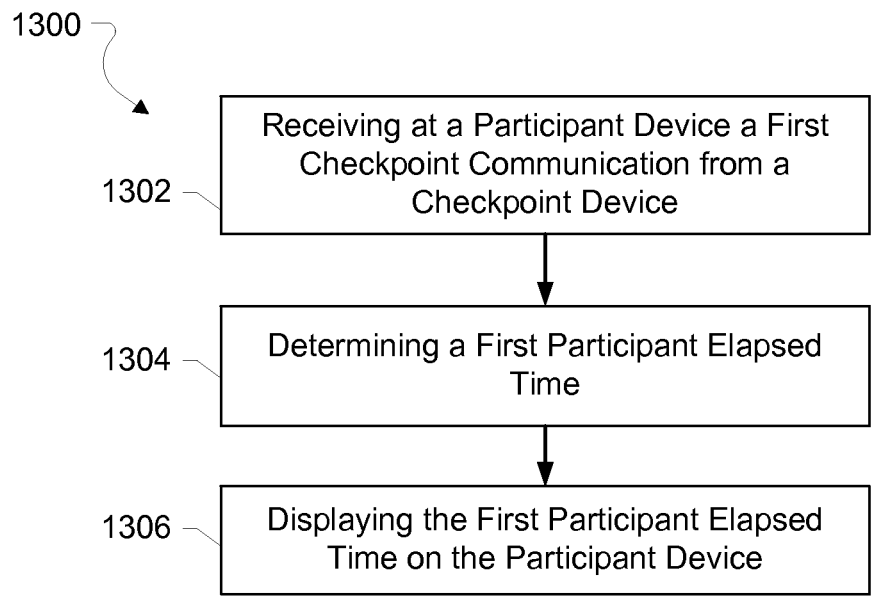
FIG. 13 is a process flow diagram of an embodiment method for presenting event feedback to a participant in an event in accordance with various embodiments.

FIG. 13 illustrates an embodiment method 1300 of providing event feedback to participants in an event of presenting event information to a participant in the event. In block 1302, a first checkpoint communication is received at a first radio of a first participant device carried by a first participant from a checkpoint device at a first checkpoint located along a first course of the event. The first checkpoint communication includes a first checkpoint identifier and a first checkpoint event time reflecting when the first participant crossed the first checkpoint. A determination is made in block 1304 of a first participant elapsed time, based upon the first checkpoint identifier and the first checkpoint event time from block 1302. The participant device may then display the first participant elapsed time on the first participant device in block 1306.

According to further alternative and/or supplemental aspects of the disclosed technologies, a participant status may be transmitted from the first participant device using a second radio of the participant device to an event server. The participant status may include the first checkpoint event time and/or the second radio may include a Wireless Wide Area Network (WWAN) transceiver. The method may also include receiving event feedback including a ranking of the first participant and displaying at least a portion of the event feedback on the first participant device. The method may further include receiving GPS location information using a third radio of the first participant device. The GPS location information identifying a geographic location of the first participant. The method may further include receiving physiological data of the first participant using a fourth radio of the first participant device. The method may further include changing the first participant elapsed time displayed on the first participant device in response to the event feedback indicating an official participant elapsed time corresponding to when the first participant crossed the first checkpoint that is different from the originally displayed first participant elapsed time. Also, as part of the method, the participant status may include at least one of GPS location information identifying a geographic location of the first participant and physiological data of the first participant. The method may further include switching power between the second radio and a third radio of the first participant device in response to the first participant device being a predetermined distance from the first checkpoint. The method may further include powering on at least one of the second radio and a third radio of the first participant device in response to the first participant device being within a predetermined distance of the first checkpoint. The method may further include transmitting a request for a second checkpoint event time in response to determining the first participant device has passed a second checkpoint without receiving a second checkpoint communication. The method may further include transmitting at least one of the first checkpoint identifier and the first checkpoint event time to a second participant device carried by the first participant during the event, the second participant device being disposed remote from the first participant device. Additionally, an ANT® protocol may be used to communicate between the first participant device and the second participant device. Further, at least one of the first checkpoint identifier and the first checkpoint event time may be transmitted by the first participant device to the second participant device regularly until a second checkpoint communication is received by the first participant device from a second checkpoint located along the first course of the event. Further still, at least one of the first checkpoint identifier and the first checkpoint event time may be transmitted by the first participant device to the second participant device for a set interval of time. Yet further still, a scan may be initiated by the second participant device for at least one of the first checkpoint identifier and the first checkpoint event time in response to a determination that the first checkpoint is within a predetermined distance from at least one of the first participant device and the second participant device. In the methods disclosed herein, the first checkpoint communication may use an ANT® communication protocol.

Figure 14:
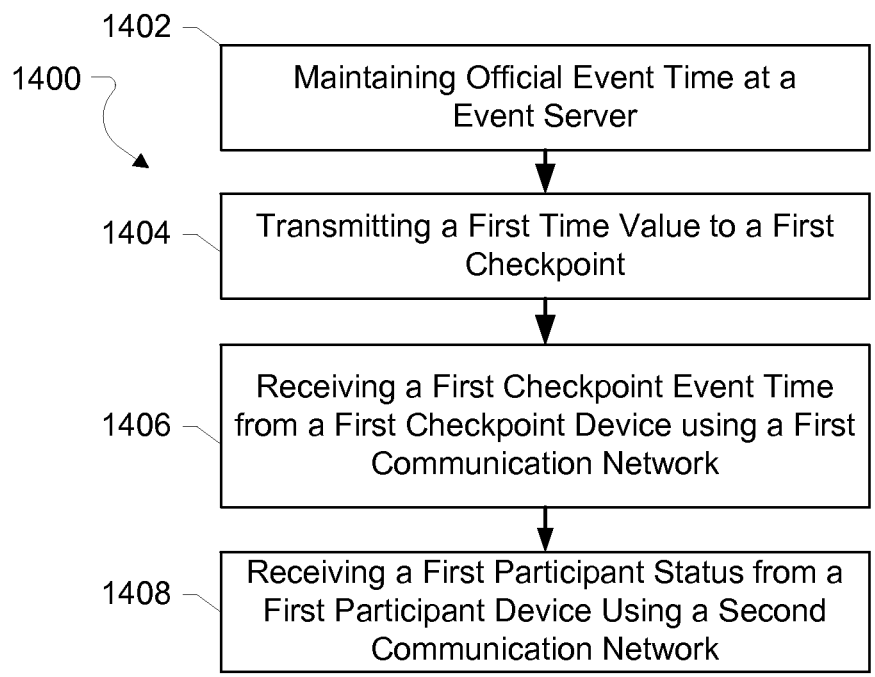
FIG. 14 is a process flow diagram of an embodiment method for tracking event feedback for participants in an event in accordance with various embodiments.

FIG. 14 illustrates a method 1400 of providing event feedback to participants in an event. In block 1402, an event server maintains an official event time during the event. In block 1404, the event server transmits a first time value to a first checkpoint device based upon the official event time. In block 1406, the event server receives a first checkpoint event time from the first checkpoint device. The first checkpoint event time may be based on the first time value and when a first participant crossed the first checkpoint. Also, the method may include receiving at the event server a participant status transmitted from a first participant device carried by the first participant during the event. The participant status may be received by way of a second communication network bypassing the first checkpoint. The participant status may include a secondary checkpoint event time associated with when the first participant crossed the first checkpoint.

According to further alternative and/or supplemental aspects of the disclosed technologies, the event feedback may be transmitted from the event server to the first participant device by way of the second communication network, with the event feedback including a ranking of the first participant. Also, the second communication network may include WWAN and the first participant device includes a WWAN transceiver. Further, the first participant status may include at least one of GPS location information identifying a geographic location of the first participant and physiological data of the first participant. The method may further include detecting at the first checkpoint the first participant device being within a predetermined distance from the first checkpoint. The first checkpoint may transmit a first checkpoint communication to a first radio of the first participant device. The first checkpoint communication may include a first checkpoint identifier and a first checkpoint event time associated with when the first participant crossed the first checkpoint. A participant elapsed time may be determined from the first checkpoint event time may be based on an official event time. Also, the first checkpoint event time may be transmitted from the checkpoint to the event server.

The first checkpoint communication may be transmitted from the first checkpoint using an ANT® communication protocol. The method may further include determining a participant identifier associated with the first participant device in response to the first participant device being detected at the first checkpoint. Also, a solid channel connection may be established between the first checkpoint and the first participant device using the participant identifier. Further, the method may include receiving at the event server a request for the first checkpoint event time transmitted from the first participant device. The method may also include transmitting from the event server the first checkpoint event time to a second radio of the first participant device by way of the second communication network. Yet further, the method may include transmitting from the event server the first time update value based on the official event time to a third checkpoint located on a second course of the event. Additionally a third checkpoint event time associated with a second participant transmitted from the third checkpoint may be received at the event server.

Figure 15:
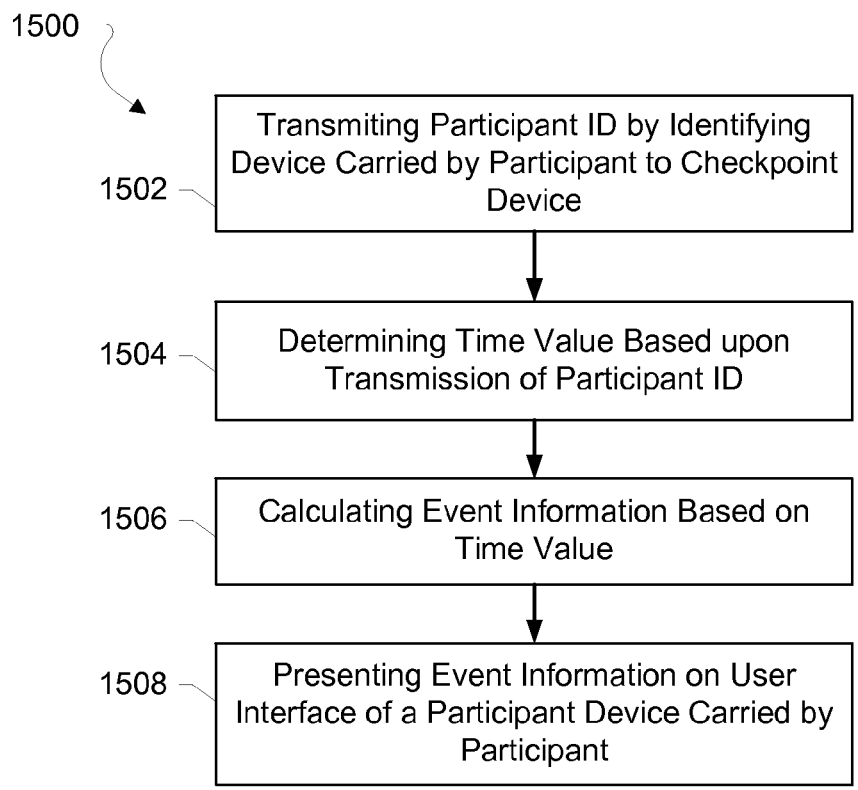
FIG. 15 is a process flow diagram of an embodiment method for presenting event feedback to a participant in an event in accordance with various embodiments.

FIG. 15 illustrates an embodiment method 1500 of presenting event information to a participant in an event. In block 1502, a participant identifier (ID) carried by a participant may transmit a participant identifier to a checkpoint device at a checkpoint of an event venue. A participant device carried by the participant may determine a time value based upon the transmitting of the participant identifier in block 1504. The participant device calculates event information associated with the participant based upon the time value in block 1506.

A user interface of the participant device may present the event information to the participation in block 1508.

Figure 16:
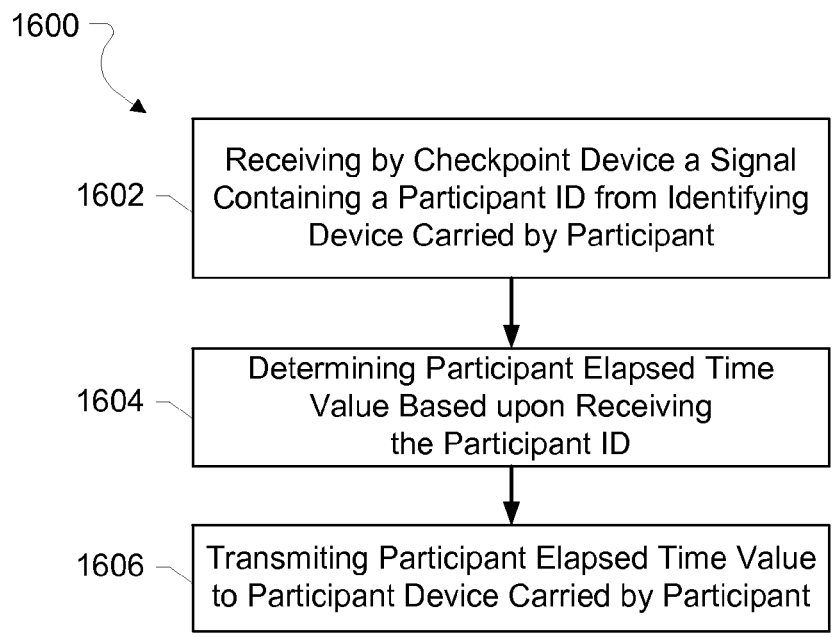
FIG. 16 is a process flow diagram of an embodiment method for tracking event feedback for participants in an event in accordance with various embodiments.

FIG. 16 illustrates an embodiment process flow diagram 1600 of tracking progress of participants in an event. In block 1602, an event feedback system receives, by a checkpoint device at a checkpoint of an event venue, a signal containing a participant identifier from a participant identifier worn or carried by a participant. In block 1604, the event feedback system determines an official time value based upon the receiving of the participant identifier. In block 1606, the event feedback system may transmit the official time value to a participant device worn or carried by the participant for presenting on a user interface.

The functions and/or protocols described above for communicating between, within and to/from the participant device(s) may alternatively be formed by any one or more of the various techniques described herein. Thus, reference to any one of the first, second, third or fourth antennas may be implemented by any one or more of the technologies described herein, such as RFID, Bluetooth®, ANT® technologies, WWAN or other communication technologies and/or protocols. Thus reference to the first, second, third or fourth antennas should not be limited to the illustrative embodiments described here.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A device adapted to be carried by a first participant during an event for presenting feedback information associated with the first participant, the device comprising:
   a first radio configured to receive a first checkpoint communication by way of a first communication network from a first checkpoint device at a first checkpoint located along a first course of the event, the first checkpoint communication including a first checkpoint identifier and a first event time reflecting when the first participant crossed the first checkpoint;
   a processor coupled to the first radio, wherein the processor is configured with processor-executable instructions to perform operations to determine a first participant elapsed time based upon a first participant event start time and the first event time;
   a second radio coupled to the processor and configured to transmit the first participant elapsed time from the device to an event server by way of a second communication network bypassing the first checkpoint device, wherein the first communication network and the second communication network are distinct; and
   a display device coupled to the processor and configured to present the first participant elapsed time.

2. The device of claim 1, wherein the second radio is configured to receive event feedback including at least one of a ranking of the first participant and information regarding at least one second participant, wherein the display device is configured to present at least a portion of the event feedback.

3. The device of claim 1, wherein the second radio is connected to a first structure of the device adapted to be carried by the first participant and the second radio is configured to receive at least one of GPS location information and physiological data associated with the first participant.

4. The device of claim 1, further comprising:
a first structure of the device adapted to be carried by the first participant and a second structure of a second device adapted to be carried by the first participant, wherein the second structure is remote from the first structure; and
wherein the second radio is connected to the second structure and is configured to receive at least one of GPS location information and physiological data associated with the first participant.

5. The device of claim 1, wherein the first radio receives at least one of an RFID signal and an ANT signal by way of the first communication network.

6. The device of claim 2, wherein the processor is configured with processor-executable instructions to perform operations to:
determine whether an official participant elapsed time is different from the first participant elapsed time based on the event feedback received; and
change a presentation of the display device presenting the first participant elapsed time in response to determining that the official participant elapsed time is different from the first participant elapsed time.

7. The device of claim 1, wherein the second radio is configured to be powered on in response to the first radio being within a predetermined distance of the first checkpoint.

8. The device of claim 1, wherein the second radio is configured to transmit a request for a second checkpoint event time in response to determining the device has passed a second checkpoint without receiving a second checkpoint communication by way of the first communication network.

9. The device of claim 1, wherein the first radio is configured to receive the first checkpoint identifier and the first event time from a second device adapted to be carried by the first participant during the event, the second device being disposed on the first participant remote from the device.

10. The device of claim 1, wherein the processor is configured with processor-executable instructions to cause the second radio to regularly transmit the first participant elapsed time until a second checkpoint communication is received by the first radio by way of the first communication network from a second checkpoint located along the first course of the event.

11. The device of claim 1, wherein the first radio is configured to scan for a second checkpoint communication by way of the first communication network from a second checkpoint device at a second checkpoint in response to a determination that the second checkpoint is within a predetermined distance.

12. A method of presenting feedback information associated with an event participant, the method comprising:
receiving by a first radio of a first device carried by a first participant, a first checkpoint communication by way of a first communication network from a first checkpoint device at a first checkpoint located along a first course of an event, the first checkpoint communication including a first checkpoint identifier and a first event time reflecting when the first participant crossed the first checkpoint;
determining, by a processor configured with processor-executable instructions, a first participant elapsed time based upon a first participant event start time and the first event time;
transmitting the first participant elapsed time from a second radio coupled to first device to an event server by way of a second communication network bypassing the first checkpoint device, wherein the first communication network and the second communication network are distinct; and
displaying the first participant elapsed time on a display device of the first device.

13. The method of claim 12, further comprising:
receiving by the second radio, by way of the second communication network, an event feedback including at least one of a ranking of the first participant and information regarding at least one second participant; and
displaying at least a portion of the event feedback on the display device of the first device.

14. The method of claim 12, further comprising:
receiving by the second radio by way of the second communication network at least one of GPS location information and physiological data associated with the first participant.

15. The method of claim 14, wherein the second radio is coupled to a second device adapted to be carried by the first participant and remote from the first device.

16. The method of claim 12, wherein at least one of an RFID signal and an ANT signal is received by the first radio by way of the first communication network.

17. The method of claim 13, further comprising:
determining whether an official participant elapsed time is different from the first participant elapsed time based on the event feedback received; and
changing the first participant elapsed time displayed on the first device in response to determining that the official participant elapsed time is different from the first participant elapsed time.

18. The method of claim 12, further comprising:
powering on the second radio in response to the first radio being within a predetermined distance of the first checkpoint.

19. The method of claim 12, further comprising:
transmitting a request for a second checkpoint event time in response to determining the first device has passed a second checkpoint without receiving a second checkpoint communication by way of the first communication network.

20. The method of claim 12, further comprising:
receiving by the first radio the first checkpoint identifier and the first event time from a second device carried by the first participant during the event, the second device being disposed on the first participant remote from the first device.

21. The method of claim 12, wherein the first participant elapsed time is regularly transmitted until a second checkpoint communication is received by the first radio by way of the first communication network from a second checkpoint located along the first course of the event.

22. The method of claim 12, further comprising:
scanning for a second checkpoint communication from a second checkpoint device at a second checkpoint using the first radio by way of the first communication network in response to determining that the second checkpoint is within a predetermined distance from the first device.

23. A device for presenting feedback information associated with an event participant, the device comprising:

means for receiving by a first radio of a first device carried by a first participant a first checkpoint communication by way of a first communication network from a first checkpoint device at a first checkpoint located along a first course of an event, the first checkpoint communication including a first checkpoint identifier and a first event time reflecting when the first participant crossed the first checkpoint;

means for determining a first participant elapsed time based upon a first participant event start time and the first event time;

means for transmitting the first participant elapsed time from a second radio coupled to the first device to an event server by way of a second communication network bypassing the first checkpoint device, wherein the first communication network and the second communication network are distinct; and means for displaying the first participant elapsed time on a display device of the first device.

24. The device of claim 23, further comprising:
means for receiving by the second radio an event feedback including at least one of a ranking of the first participant and information regarding at least one second participant, wherein the means for displaying is configured to present at least a portion of the event feedback on the first device.

25. The device of claim 23, further comprising:
means for receiving by the second radio at least one of GPS location information and physiological data associated with the first participant.

26. The device of claim 25, wherein the second radio is coupled to a second device adapted to be carried by the first participant and remote from the first device.

27. The device of claim 23, further comprising:
means for receiving at least one of an RFID signal and an ANT signal at the first radio by way of the first communication network.

28. The device of claim 24, further comprising:
means for determining whether an official participant elapsed time is different from the first participant elapsed time based on the event feedback received; and
means for changing the first participant elapsed time displayed on the display device of the first device in response to determining that the official participant elapsed time is different from the first participant elapsed time.

29. The device of claim 23, further comprising:
means for powering the second radio in response to the first radio being within a predetermined distance of the first checkpoint.

30. The device of claim 23, further comprising:
means for transmitting a request for a second checkpoint event time in response to determining the first device has passed a second checkpoint without receiving a second checkpoint communication by way of the first communication network.

31. The device of claim 23, further comprising:
means for receiving of the first checkpoint identifier and the first event time from a second device carried by the first participant during the event, the second device being disposed on the first participant remote from the first device.

32. The device of claim 23, wherein the first participant elapsed time is regularly transmitted until a second checkpoint communication is received by the first radio by way of the first communication network from a second checkpoint device located along the first course of the event.

33. The device of claim 23, further comprising:
means for scanning for a second checkpoint communication by way of the first communication network from a second checkpoint device at a second checkpoint using the first radio in response to determining that the second checkpoint is within a predetermined distance from the first device.

34. A non-transitory computer-readable medium having stored thereon processor-executable instructions, which when executed by a processor of a first device, configures the first device to perform operations, comprising:
receiving by a first radio of the first device carried by a first participant a first checkpoint communication by way of a first communication network from a first checkpoint device at a first checkpoint located along a first course of an event, the first checkpoint communication including a first checkpoint identifier and a first event time reflecting when the first participant crossed the first checkpoint;
determining a first participant elapsed time based upon a first participant event start time and the first event time;
transmitting the first participant elapsed time from a second radio coupled to the first device to an event server by way of a second communication network bypassing the first checkpoint device, wherein the first communication network and the second communication network are distinct; and
displaying the first participant elapsed time on a display device of the first device.

35. The non-transitory computer-readable medium of claim 34, wherein the stored processor-executable instructions are configured to cause the processor of the first device to perform operations further comprising:
receiving by the second radio, by way of the second communication network, an event feedback including at least one of a ranking of the first participant and information regarding at least one second participant; and
displaying at least a portion of the event feedback on the display device of the first device.

36. The non-transitory computer-readable medium of claim 34, wherein the stored processor-executable instructions are configured to cause the processor of the first device to perform operations further comprising:
receiving by the second radio at least one of GPS location information and physiological data associated with the first participant.

37. The non-transitory computer-readable medium of claim 36, wherein the second radio is coupled to a second device adapted to be carried by the first participant remote from the first device.

38. The non-transitory computer-readable medium of claim 34, wherein the first radio receives at least one of an RFID signal and an ANT signal by way of the first communication network.

39. The non-transitory computer-readable medium of claim 35, wherein the stored processor-executable instructions are configured to cause the processor of the first device to perform operations further comprising:
determining whether an official participant elapsed time is different from the first participant elapsed time based on the event feedback received; and
changing the first participant elapsed time displayed on the display device of the first device in response to determining that the official participant elapsed time is different from the first participant elapsed time.

40. The non-transitory computer-readable medium of claim 34, wherein the stored processor-executable instructions are configured to cause the processor of the first device to perform operations further comprising:

powering on the second radio in response to the first radio being within a predetermined distance of the first checkpoint.

41. The non-transitory computer-readable medium of claim 34, wherein the stored processor-executable instructions are configured to cause the processor of the first device to perform operations further comprising:

transmitting a request for a second checkpoint event time in response to determining the first device has passed a second checkpoint without receiving a second checkpoint communication by way of the first communication network.

42. The non-transitory computer-readable medium of claim 34, wherein the stored processor-executable instructions are configured to cause the processor of the first device to perform operations further comprising:

receiving the first checkpoint identifier and the first event time from a second device carried by the first participant during the event, the second device being disposed on the first participant remote from the first device.

43. The non-transitory computer-readable medium of claim 34, wherein the stored processor-executable instructions are configured to cause the processor of the first device to perform operations comprising:

regularly transmit the first participant elapsed time until a second checkpoint communication is received by the first radio by way of the first communication network from a second checkpoint located along the first course of the event.

44. The non-transitory computer-readable medium of claim 34, wherein the stored processor-executable instructions are configured to cause the processor of the first device to perform operations further comprising:

scanning for a second checkpoint communication by way of the first communication network from a second checkpoint device at a second checkpoint using the first radio in response to determining that the second checkpoint is within a predetermined distance from the first device.

* * * * *